US008687047B2

(12) United States Patent
Hasegawa

(10) Patent No.: US 8,687,047 B2
(45) Date of Patent: Apr. 1, 2014

(54) COMPOUND-EYE IMAGING APPARATUS

(75) Inventor: Yuji Hasegawa, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 663 days.

(21) Appl. No.: 12/840,104

(22) Filed: Jul. 20, 2010

(65) Prior Publication Data

US 2011/0018971 A1    Jan. 27, 2011

(30) Foreign Application Priority Data

Jul. 21, 2009 (JP) ................................ 2009-170250

(51) Int. Cl.
*H04N 13/02*    (2006.01)

(52) U.S. Cl.
USPC ................. 348/47; 348/42; 348/46; 348/159; 348/E5.024; 348/E13.074; 382/154; 382/294; 386/223

(58) Field of Classification Search
USPC ........................................................ 382/154
See application file for complete search history.

(56) References Cited

U.S. PATENT DOCUMENTS

| 6,549,650 | B1 * | 4/2003 | Ishikawa et al. | 382/154 |
|---|---|---|---|---|
| 7,112,774 | B2 * | 9/2006 | Baer | 250/208.1 |
| 7,119,842 | B2 * | 10/2006 | Seo | 348/348 |
| 7,936,384 | B2 * | 5/2011 | Sawachi | 348/240.1 |
| 2005/0219239 | A1 * | 10/2005 | Mashitani et al. | 345/419 |
| 2006/0029272 | A1 * | 2/2006 | Ogawa | 382/154 |
| 2007/0076112 | A1 * | 4/2007 | Nakano et al. | 348/311 |
| 2007/0296809 | A1 * | 12/2007 | Newbery | 348/42 |
| 2008/0131107 | A1 * | 6/2008 | Ueno | 396/50 |
| 2008/0316300 | A1 * | 12/2008 | Okamoto | 348/47 |
| 2009/0027487 | A1 * | 1/2009 | Misawa | 348/51 |
| 2009/0027520 | A1 * | 1/2009 | Steinberg et al. | 348/241 |
| 2010/0166294 | A1 * | 7/2010 | Marrion et al. | 382/154 |
| 2010/0309292 | A1 * | 12/2010 | Ho et al. | 348/47 |
| 2011/0018970 | A1 * | 1/2011 | Wakabayashi | 348/47 |

FOREIGN PATENT DOCUMENTS

| JP | 08-054694 | A |  | 2/1996 |  |
|---|---|---|---|---|---|
| JP | 08054694 | A | * | 2/1996 | ............ G03B 35/08 |
| JP | 2001-218501 | A |  | 8/2002 |  |
| JP | 2005-73012 | A |  | 3/2005 |  |

(Continued)

OTHER PUBLICATIONS

Japanese Office Action (Notification of Reason for Rejection) for Application No. 2009-170250, dated Dec. 18, 2012.

(Continued)

*Primary Examiner* — Christopher S Kelley
*Assistant Examiner* — Kaitlin A Retallick
(74) *Attorney, Agent, or Firm* — Birch, Stewart, Kolasch & Birch, LLP

(57) ABSTRACT

A stereoscopic image with a predetermined parallax can be automatically taken, and a stereoscopic image with an arbitrary parallax can also be taken based on selection made by a photographer. An imaging apparatus includes two or more imaging systems. First, a guidance indicating that a first imaging system is used to take a first image and that a second imaging system is used to take a second image, is displayed on a monitor of the imaging apparatus. After the first image is shot by the first imaging system, a live view image shot by the second imaging system is displayed in a semi-transparent manner with the shot first image on the monitor, and a guidance is also displayed on the monitor. When the release switch is depressed, the second image is shot by the right imaging system.

9 Claims, 19 Drawing Sheets

(56) References Cited

FOREIGN PATENT DOCUMENTS

| | | | |
|---|---|---|---|
| JP | 2005-086219 A | | 3/2005 |
| JP | 2005-292671 A | | 10/2005 |
| JP | 2006-238086 A | | 9/2006 |
| JP | 2006238086 A | * | 9/2006 |
| JP | 2009-042082 A | | 2/2009 |
| JP | 2009-130526 A | | 6/2009 |

OTHER PUBLICATIONS

Japanese Office Action (Notification of Reason for Rejection) for Japanese application 2009-170250, dated May 1, 2013.

* cited by examiner

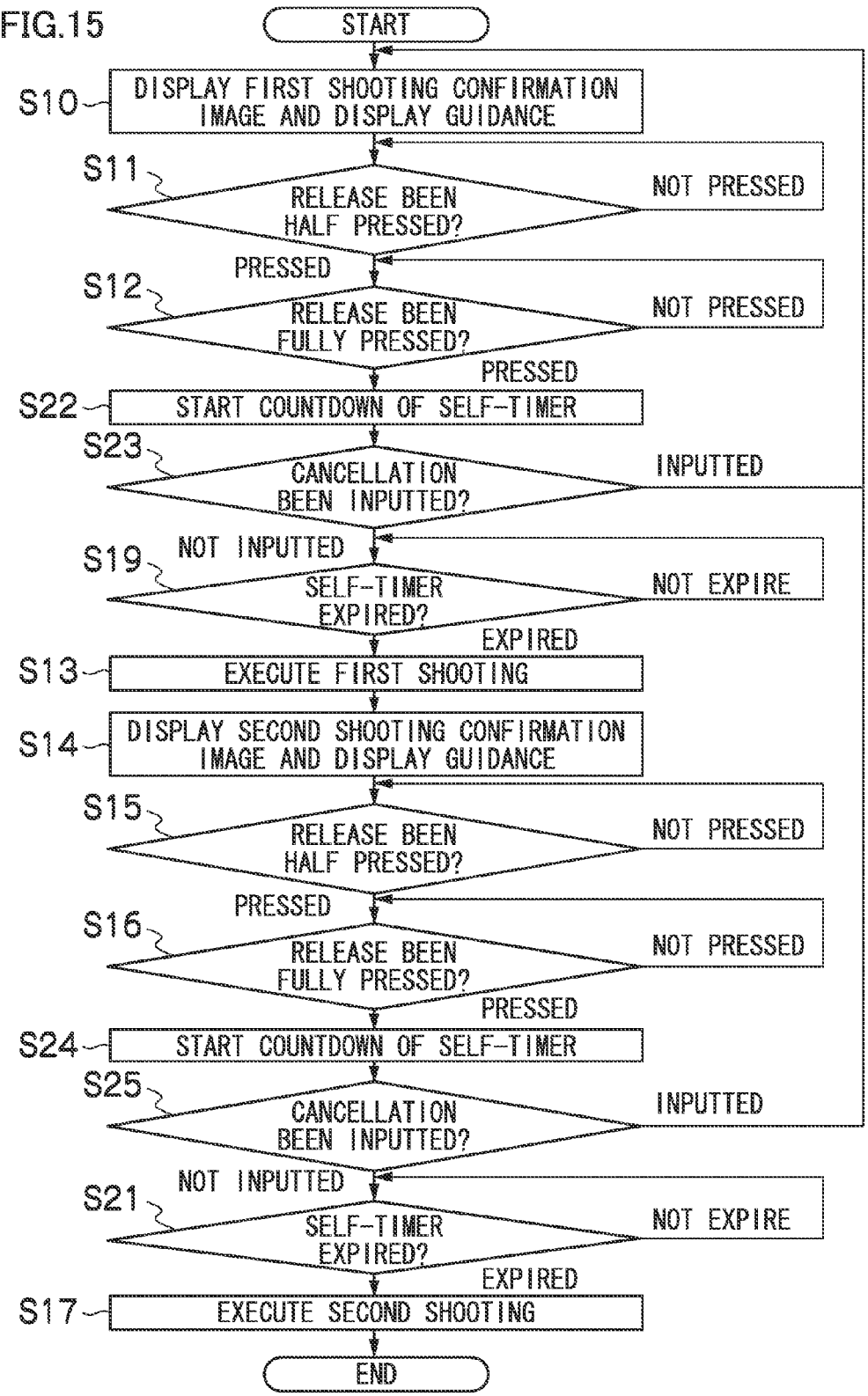

COMPOUND-EYE IMAGING APPARATUS

BACKGROUND OF THE INVENTION

1. Field of the Invention

The presently disclosed subject matter relates to a compound-eye imaging apparatus, and more particularly, to a compound-eye imaging apparatus which can take a stereoscopic image.

2. Description of the Related Art

Japanese Patent Application Laid-Open No. 2006-238086 proposes a digital camera for a stereograph, in which, when a first image is taken, a distance to a subject is measured, a modified image suitable for generating a stereoscopic image is generated based on the measured distance, a zoom ratio and the like, and semi-transparent display of the modified image is performed on a display unit. According to this digital camera for the stereograph, a photographer takes a second image in accordance with a semi-transparent image, and thereby, two images for the stereoscopic image can be taken.

SUMMARY OF THE INVENTION

In the invention described in Japanese Patent Application Laid-Open No. 2006-238086, since only one image pickup device is provided, there is a problem in that the stereoscopic image cannot be taken unless the camera is moved. Moreover, in the invention described in Japanese Patent Application Laid-Open No. 2006-238086, since only one image pickup device is provided, there is a problem in that the first taken image must be stored in order to take the second image.

Moreover, in the invention described in Japanese Patent Application Laid-Open No. 2006-238086, the shooting is performed in accordance with the modified image which is displayed in a semi-transparent manner on the display unit, and thereby, the stereoscopic image can be taken. Thus, as long as the shooting is performed according to an instruction thereof, there is a problem in that the photographer cannot select a stereoscopic effect for the stereoscopic image.

The presently disclosed subject matter has been made in view of the above situation, and an object of the presently disclosed subject matter is to provide a compound-eye imaging apparatus which can automatically take a stereoscopic image with a predetermined parallax, and can also take a stereoscopic image with an arbitrary parallax based on selection made by a photographer.

In order to achieve the object, a compound-eye imaging apparatus according to a first aspect of the presently disclosed subject matter includes: two image pickup devices which take subject images viewed from two viewpoints, as a stereoscopic image; a shooting mode setting device which sets a 3D (three dimensional) double shooting mode in which one of the two image pickup devices is used to perform shooting by a first shutter release operation, and the other one of the two image pickup devices is used to perform shooting by a second shutter release operation; a determination device which, if the 3D double shooting mode has been set, accepts a shutter release operation, and determines whether the accepted shutter release operation is the first shutter release operation or the second shutter release operation; and a shooting control device which controls the two image pickup devices in a manner that a predetermined one image pickup device in the two image pickup devices is used to perform shooting if it is determined by the determination device that the first shutter release operation is accepted, and that the other image pickup device in the two image pickup devices is used to perform shooting if it is determined by the determination device that the second shutter release operation is accepted.

According to the compound-eye imaging apparatus according to the first aspect, the two image pickup devices can be used to take subject images viewed from the two viewpoints, as the stereoscopic image, and the 3D double shooting mode can be set in which one of the two image pickup devices is used to perform shooting by one shutter release operation (first shutter release operation), and the other one of the two image pickup devices is used to perform shooting by the next shutter release operation (second shutter release operation). In the 3D double shooting mode, the shutter release operation is accepted, and it is determined whether the accepted shutter release operation is the first shutter release operation or the second shutter release operation. If it is determined that the first shutter release operation is accepted, the predetermined one image pickup device in the two image pickup devices is used to perform shooting, and if it is determined that the second shutter release operation is accepted, the other image pickup device in the two image pickup devices is used to perform shooting. Thereby, the stereoscopic image with a predetermined parallax can be automatically shot, and the stereoscopic image with an arbitrary parallax can also be shot based on the selection made by the photographer.

The compound-eye imaging apparatus according to a second aspect of the presently disclosed subject matter, the compound-eye imaging apparatus according to the first aspect, further includes a storage device which stores an image outputted from the predetermined one image pickup device by the first shutter release operation, and a picked-up image outputted from the other image pickup device by the second shutter release operation, in one file.

According to the compound-eye imaging apparatus according to the second aspect, the image shot by the first shutter release operation and the image shot by the second shutter release operation are stored in one file. Thereby, even if the file is copied, moved or the like, the two images constituting the stereoscopic image are not separated.

The compound-eye imaging apparatus according to a third aspect of the presently disclosed subject matter, the compound-eye imaging apparatus according to the first or second aspect, further includes: a display device which can display a stereoscopic image or a plane image; and a display control device which, if it is determined by the determination device that the first shutter release operation is accepted and that the second shutter release operation has not been accepted yet, displays of the image outputted from the predetermined image pickup device by the first shutter release operation in a semi-transparent manner on the display device, and displays a picked-up image outputted from the other image pickup device, as a shooting confirmation image, on the display device.

According to the compound-eye imaging apparatus according to the third aspect, if it is determined that the first shutter release operation is accepted and that the second shutter release operation has not been accepted yet, the image outputted from the predetermined image pickup device by the first shutter release operation is the semi-transparently displayed on the display device, and also, the picked-up image outputted from the other image pickup device is displayed as the shooting confirmation image, on the display device. Thereby, the photographer can confirm the two images constituting the stereoscopic image, and then perform shooting.

The compound-eye imaging apparatus according to a fourth aspect of the presently disclosed subject matter, the compound-eye imaging apparatus according to any of the first to third aspects, further includes a self-timer setting device which sets a self-timer mode, wherein if the self-timer mode is set, the shooting control device uses any one of the two image pickup devices to perform shooting, after a first time elapses since it is determined that the shutter release operation is accepted.

According to the compound-eye imaging apparatus according to the fourth aspect, if the self-timer mode has been set, shooting is performed after the first time elapses since it is determined that the shutter release operation is accepted. Thereby, camera shake due to depression of a release switch or the like can be prevented.

The compound-eye imaging apparatus according to a fifth aspect of the presently disclosed subject matter, the compound-eye imaging apparatus according to any of the first to fourth aspects, further includes a cancellation input device which inputs cancellation of the 3D double shooting mode, wherein if the cancellation of the 3D double shooting mode is inputted after the first shutter release operation is accepted by the determination device, the determination device determines the shutter release operation which is accepted next, as the first shutter release operation.

According to the compound-eye imaging apparatus according to the fifth aspect, if the cancellation of the 3D double shooting mode is inputted after the first shutter release operation is accepted, the shooting is canceled, and the shutter release operation which is accepted next is determined as the first shutter release operation. Thereby, if the cancellation of the shooting has been inputted, it is possible to start shooting automatically again from the beginning.

The compound-eye imaging apparatus according to a sixth aspect of the presently disclosed subject matter, the compound-eye imaging apparatus according to any of the first to third aspects, further includes a time interval difference shooting mode setting device which sets a time interval difference shooting mode in which two images are taken with a time interval difference by one shutter release operation, wherein if the time interval difference shooting mode has been set, the shooting control device uses the other image pickup device to perform shooting, after a second time elapses since it is determined that the first shutter release operation is accepted.

According to the compound-eye imaging apparatus according to the sixth aspect, if the time interval difference shooting mode is set in which the two images are taken with a time interval difference by one shutter release operation, the other image pickup device is used to perform shooting, after the second time elapses since it is determined that the first shutter release operation is accepted. Thereby, a first image and a second image can be shot with a predetermined time interval difference by one release operation.

In the compound-eye imaging apparatus according to a seventh aspect of the presently disclosed subject matter, in the compound-eye imaging apparatus according to any of the first to sixth aspects, the display control device displays a picked-up image outputted from any one of the two image pickup devices, as a shooting confirmation image, on the display device, and displays guidance indicating which of the two image pickup devices is the predetermined image pickup device, on the display device.

According to the compound-eye imaging apparatus according to the seventh aspect, the guidance indicating which of the two image pickup devices is the predetermined image pickup device (for example, if the first image is taken by a left imaging system and the second image is taken by a right imaging system, a left imaging system is the predetermined image pickup device) is displayed with the shooting confirmation image on the display device. Thereby, the photographer can recognize at a glance which image pickup device is used to perform shooting.

The compound-eye imaging apparatus according to an eighth aspect of the presently disclosed subject matter, the compound-eye imaging apparatus according to any of the first to seventh aspects, further includes a shooting order setting device which sets which of the two image pickup devices is the predetermined image pickup device.

According to the compound-eye imaging apparatus according to the eighth aspect, it is possible to set a shooting order indicating which of the two image pickup devices is the predetermined image pickup device, that is, which imaging system is used to perform shooting first. Thereby, the photographer can shoot an image which he/she desires to shot.

According to the presently disclosed subject matter, the stereoscopic image with a predetermined parallax can be automatically shot, and the stereoscopic image with an arbitrary parallax can also be shot based on the selection made by the photographer.

BRIEF DESCRIPTION OF THE DRAWINGS

FIG. 1A is a front view and FIG. 1B is a rear view;

FIG. 14A shows the shooting confirmation screen in the shooting preparation phase for a first image, and FIG. 14B shows the shooting confirmation screen in the shooting preparation phase for a second image;

FIG. 15 is a flowchart showing a flow of the shooting process in the 3D double shooting mode in a compound-eye digital camera 3 according to a third embodiment of the presently disclosed subject matter;

FIG. 20A shows a case where a first image is shot by a left imaging system, and FIG. 20B shows a case where the first image is shot by a right imaging system;

FIG. 23A shows the shooting confirmation screen in the shooting preparation phase for a first image, and FIG. 23B shows the shooting confirmation screen in the shooting preparation phase for a second image.

DETAILED DESCRIPTION OF THE PREFERRED EMBODIMENTS

Hereinafter, the best mode for carrying out a compound-eye imaging apparatus according to the presently disclosed subject matter will be described in detail according to the accompanying drawings.

<First Embodiment>

Figure 1A:
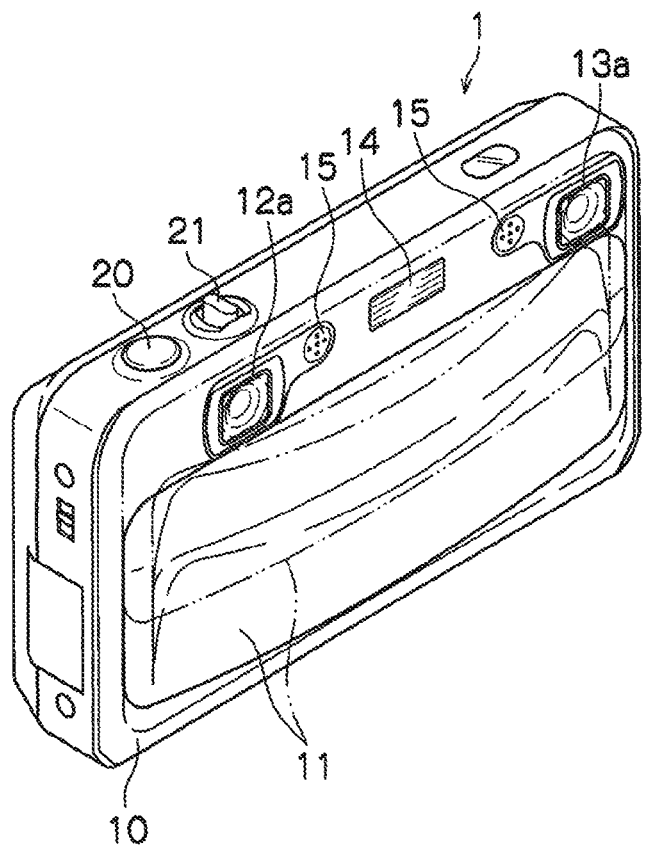
FIGS. 1A and 1B are schematic diagrams of a compound-eye digital camera 1 according to a first embodiment of the presently disclosed subject matter.
Figure 1B:
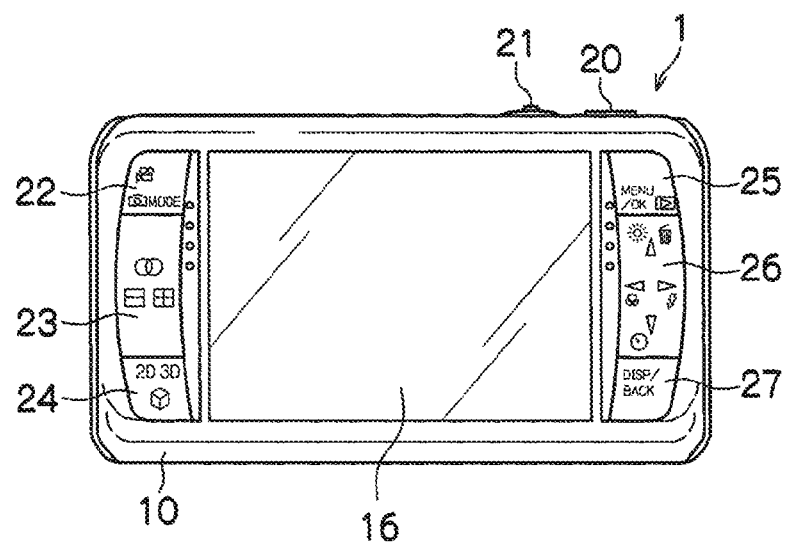

FIGS. 1A and 1B are schematic diagrams of a compound-eye digital camera 1 which is the compound-eye imaging apparatus according to the presently disclosed subject matter, and FIG. 1A is a front view and FIG. 1B is a rear view. The compound-eye digital camera 1 includes a plurality (two are illustrated in FIG. 1) of imaging systems, and can take a stereoscopic image of an identical subject viewed from a plurality of viewpoints (two viewpoints of left and right are illustrated in FIG. 1) and a single viewpoint image (two-dimensional image). Moreover, the compound-eye digital camera 1 can also record and reproduce moving images and audio, in addition to still images.

A camera body 10 of the compound-eye digital camera 1 is formed in a generally rectangular parallelepiped box shape, and on the front face thereof, as shown in FIG. 1A, a barrier 11, a right imaging system 12 (see FIG. 2), a left imaging system 13 (see FIG. 2), a flash 14 and two microphones 15 are mainly provided. Moreover, on the upper surface of the camera body 10, a release switch 20 and a zoom button 21 are mainly provided.

On the other hand, on the back surface of the camera body 10, as shown in FIG. 1B, a monitor 16, a mode button 22, a parallax adjustment button 23, a 2D/3D switching button 24, a MENU/OK button 25, a cross button 26 and a DISP/BACK button 27 are provided.

The barrier 11 is slidably mounted on the front surface of the camera body 10, and an open state and a closed state are switched by vertical sliding the barrier 11. Usually, as shown by a dotted line in FIG. 1A, the barrier 11 is positioned at the upper end of the camera body 10, that is, in the closed state, and objective lenses 12a and 13a and the like are covered by the barrier 11. Thereby, damage of the lens or the like is prevented. When the barrier 11 is slid downward, the barrier is positioned at the lower end of the camera body 10, that is, in the open state (see a solid line in FIG. 1A), the lenses and the like disposed on the front surface of the camera body 10 are exposed. When a sensor (not shown) recognizes that the barrier 11 is in the open state, power of the camera 1 is turned ON by a CPU 110 (see FIG. 2), and images can be taken.

Figure 2:
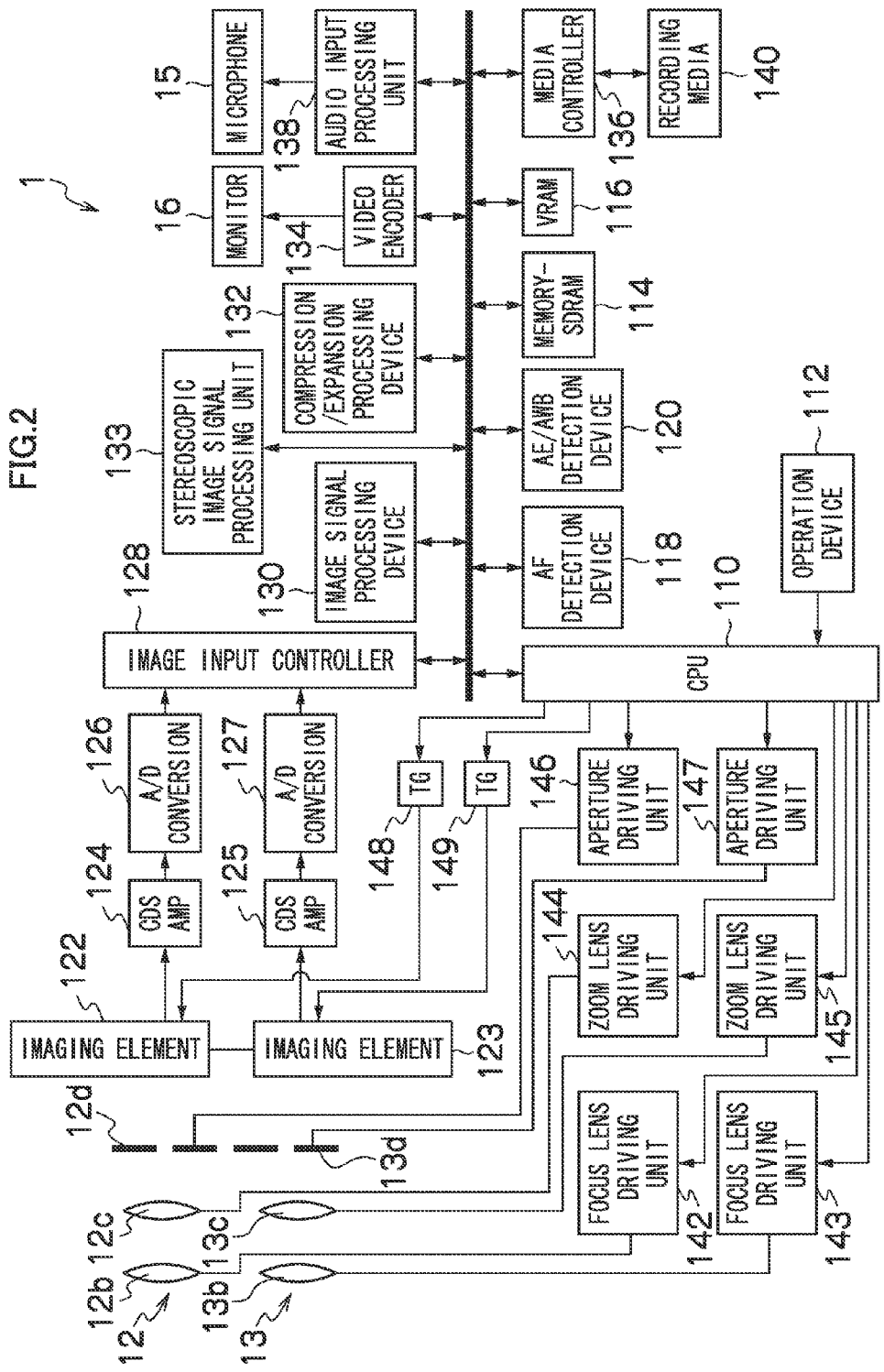
FIG. 2 is a block diagram showing an electrical configuration of the compound-eye digital camera 1.

The right imaging system 12 (see FIG. 2) which takes an image for a right eye and the left imaging system 13 (see FIG. 2) which takes an image for a left eye are optical units respectively include image taking lens groups having refractive optical systems, mechanical shutters with apertures 12d and 13d, and imaging elements 122 and 123 (see FIG. 2). The image taking lens groups of the right imaging system 12 and the left imaging system 13 are configured to mainly include the objective lenses 12a and 13a which capture light from the subject, prisms (not shown) which generally vertically bend optical paths entered from the objective lenses, zoom lenses 12c and 13c (see FIG. 2), focus lenses 12b and 13b (see FIG. 2), and the like.

The flash 14 includes, for example, a xenon tube, and light is emitted if needed, as in a case where an image of a dark subject is taken, or against the light, or the like.

The monitor 16 is, for example, a liquid crystal monitor which has a general aspect ratio of 4:3 and can perform color display, and can display both a stereoscopic image (three dimensional image or 3D image) and a plane image. Although a detailed structure of the monitor 16 is not shown, the monitor 16 is a 3D monitor employing a parallax barrier system, which includes a parallax barrier display layer on a surface thereof. The monitor 16 is used as a user interface display panel when various setting operations are performed, and is used as an electronic viewfinder when an image is taken.

In the monitor 16, a mode for displaying the stereoscopic image (3D mode) and a mode for displaying the plane image (two dimensional mode or 2D mode) can be switched. In the 3D mode, a parallax barrier including a pattern, in which light transmissive portions and light blocking portions are alternately arranged at a predetermined pitch, is generated on the parallax barrier display layer of the monitor 16, and also, on an image display surface which is a lower layer thereof, strip-shaped image fragments representing left and right images are alternately arranged and displayed. In the 2D mode, or when the monitor 16 is used as the user interface display panel, nothing is displayed on the parallax barrier display layer, and on the image display surface which is the lower layer thereof, one image is directly displayed.

It should be noted that the monitor 16 is not limited to the parallax barrier system, and a lenticular system, an integral photography system using a micro lens array sheet, a holography system using an interference phenomenon, or the like may be employed. Moreover, the monitor 16 is not limited to the liquid crystal monitor, and an organic EL or the like may be employed.

The release switch 20 is configured with a switch of a two-stage stroke system including so-called "half pressing" and "full pressing". In the compound-eye digital camera 1, when a still image is taken (for example, when a still image shooting mode is selected via the mode button 22, or when the still image shooting mode is selected from a menu), if this release switch 20 is half pressed, a shooting preparation process, that is, respective processes including AE (Automatic Exposure), AF (Auto Focus) and AWB (Automatic White Balance) are performed, and if this release switch 20 is fully pressed, shooting and recording processes of the image are performed. Moreover, when a moving image is taken (for example, when a moving image shooting mode is selected via the mode button 22, or when the moving image shooting mode is selected from the menu), if this release switch 20 is fully pressed, the shooting of the moving image is started, and if this release switch 20 is fully pressed again, the shooting is terminated.

The zoom button 21 is used for zoom operations of the right imaging system 12 and the left imaging system 13, and is configured with a zoom tele button 21T which instructs to zoom in a telephoto side, and a zoom wide button 21W which instructs to zoom in a wide-angle side.

The mode button 22 functions as a shooting mode setting device which sets a shooting mode of the digital camera 1, and the shooting mode of the digital camera 1 is set to various modes depending on a set position of this mode button 22. The shooting mode includes "moving image shooting mode" which performs the moving image shooting, and "still image shooting mode" which performs the still image shooting. "Still image shooting mode" includes, for example, "automatic shooting mode" in which an aperture, a shutter speed and the like are automatically set by the digital camera 1, "face extraction-shooting mode" in which a person's face is extracted and shot, "sports shooting mode" suitable for shooting an image of a moving object, "landscape shooting mode" suitable for shooting an image of a landscape, "night scene shooting mode" suitable for shooting images of an evening scene and a night scene, "aperture priority-shooting mode" in which a scale of the aperture is set by a user and the shutter speed is automatically set by the digital camera 1, "shutter speed priority-shooting mode" in which the shutter speed is set by the user and the scale of the aperture is automatically set by the digital camera 1, "manual shooting mode" in which the aperture, the shutter speed and the like are set by the user, and the like.

The parallax adjustment button 23 is a button which electronically adjusts a parallax when the stereoscopic image is taken. When the upper side of the parallax adjustment button 23 is depressed, a parallax between the image taken by the right imaging system 12 and the image taken by the left imaging system 13 is increased by a predetermined distance, and when the lower side of the parallax adjustment button 23 is depressed, the parallax between the image taken by the right imaging system 12 and the image taken by the left imaging system 13 is decreased by the predetermined distance.

The 2D/3D switching button 24 is a switch for instructing to switch between a 2D shooting mode for taking a single viewpoint image, and a 3D shooting mode for taking a multi-viewpoint image.

The MENU/OK button 25 is used for invoking various setting screens (menu screens) for shooting and reproduction functions (MENU function), and is also used for confirming contents of selection, instructing to execute processes, and the like (OK function), and all adjustment items included in the compound-eye digital camera 1 are set. If the MENU/OK button 25 is depressed when an image is shot, for example, a setting screen for image quality adjustment or the like including an exposure value, a color tone, an ISO sensitivity, and the recording pixel count and the like is displayed on the monitor 16. If the MENU/OK button 25 is depressed when the reproduction is performed, a setting screen for erasure of the image or the like is displayed on the monitor 16. The compound-eye digital camera 1 operates depending on conditions set on this menu screen.

The cross button 26 is a button which performs setting and selection of various kinds of menu, or performs zoom, and is provided so that pressing operations of the button in four directions of up, down, left and right can be performed, and each direction button is assigned with a function depending on a setting state of the camera. For example, when shooting is performed, a left button is assigned with a function of switching ON/OFF of a macro function, and a right button is assigned with a function of switching a flash mode. Moreover, an up button is assigned with a function of changing brightness of the monitor 16, and a down button is assigned with a function of switching ON/OFF or time of a self-timer. Moreover, when reproduction is performed, the right button is assigned with a frame advance function, and the left button is assigned with a frame return function. Moreover, the up button is assigned with a function of deleting the image being reproduced. Moreover, when various settings are performed, a function of moving a cursor displayed on the monitor 16 into each button direction is assigned.

The DISP/BACK button 27 functions as a button which instructs to switch the display of the monitor 16, and during the shooting, if this DISP/BACK button 27 is depressed, the display of the monitor 16 is switched as ON→framing guide display→OFF. Moreover, during the reproduction, if this DISP/BACK button 27 is depressed, the display is switched as normal reproduction→reproduction without text display→multi-reproduction. Moreover, the DISP/BACK button 27 functions as a button which instructs to cancel an input operation or return to a previous operation state.

FIG. 2 is a block diagram showing a main internal configuration of the compound-eye digital camera 1. The compound-eye digital camera 1 is configured to mainly have the CPU 110, an operation device (the release switch 20, the MENU/OK button 25, the cross button 26 and the like) 112, an SDRAM (Synchronous Dynamic Random Access Memory) 114, a VRAM (Video RAM) 116, an AF detection device 118, an AE/AWB detection device 120, the imaging elements 122 and 123, CDS (Correlated Double Sampling)/AMPs (Amplifiers) 124 and 125, A/D converters 126 and 127, an image input controller 128, an image signal processing device 130, a stereoscopic image signal processing unit 133, a compression/expansion processing device 132, a video encoder 134, a media controller 136, an audio input processing unit 138, a recording media 140, focus lens driving units 142 and 143, zoom lens driving units 144 and 145, aperture driving units 146 and 147, and timing generators (TGs) 148 and 149.

The CPU 110 controls the entire operation of the compound-eye digital camera 1 in an integrated manner. The CPU 110 controls operations of the right imaging system 12 and the left imaging system 13. While the right imaging system 12 and the left imaging system 13 basically work with each other to perform the operations, each of the right imaging system 12 and the left imaging system 13 can also be individually operated. Moreover, the CPU 110 generates display image data in which two pieces of image data obtained by the right imaging system 12 and the left imaging system 13 are alternately displayed as strip-shaped image fragments on the monitor 16. When the display is performed in the 3D mode, the parallax barrier including the pattern, in which the light transmissive portions and the light blocking portions are alternately arranged at the predetermined pitch, is generated on the parallax barrier display layer, and also, on the image display surface which is the lower layer thereof, the strip-shaped image fragments representing the left and right images are alternately arranged and displayed, and thereby, stereoscopic viewing is enabled.

In the SDRAM 114, firmware which is a control program executed by this CPU 110, various data required for control, camera setting values, taken image data and the like are recorded.

The VRAM 116 is used as a work area of the CPU 110, and is also used as a temporary storage area for the image data.

The AF detection device 118 calculates a physical amount required for AF control, from an inputted image signal, according to a command from the CPU 110. The AF detection device 118 includes a right imaging system-AF control circuit which performs the AF control based on an image signal inputted from the right imaging system 12, and a left imaging system-AF control circuit which performs the AF control based on an image signal inputted from the left imaging system 13. In the digital camera 1 of the present embodiment, the AF control is performed based on contrast of images obtained from the imaging elements 122 and 123 (so-called contrast AF), and the AF detection device 118 calculates a focus evaluation value indicating sharpness of the images from the inputted image signals. The CPU 110 detects a position at which the focus evaluation value calculated by this AF detection device 118 becomes a local maximum, and moves a focus lens group to the position. In other words, the focus lens group is moved by each predetermined step from a close range to infinity, the focus evaluation value is obtained at each position, a position at which the obtained focus evaluation value is local maximum is set as a focused position, and the focus lens group is moved to the position.

The AE/AWB detection device 120 calculates physical amounts required for AE control and AWB control, from the inputted image signal, according to the command from the CPU 110. For example, as the physical amount required for the AE control, one screen is divided into a plurality of areas (for example, 16×16), and an integration value of R, G and B image signals is calculated for each divided area. The CPU 110 detects the brightness of the subject (subject luminance) based on the integration value obtained from this AE/AWB detection device 120, and calculates the exposure value (shooting EV value) suitable for the shooting. Then, an aperture value and the shutter speed are decided from the calculated shooting EV value and a predetermined program diagram. Moreover, as the physical amount required for the AWB control, one screen is divided into a plurality of areas (for example, 16×16), and an average integration value for each color of the R, G and B image signals is calculated for each divided area. The CPU 110 obtains R/G and B/G ratios for each divided area from an R integration value, a B integration value and a G integration value, which have been obtained, and performs light source type discrimination based on distribution or the like of the obtained values of R/G and B/G in R/G and B/G color spaces. Then, according to a white balance adjustment value suitable for a discriminated light source type, for example, gain values (white balance correction values) for the R, G and B signals in a white balance adjustment circuit is decided so that a value of each ratio is approximately 1 (that is, an RGB integration ratio becomes R:G:B≈1:1:1 in one screen).

The imaging elements 122 and 123 are configured with, for example, color CCDs (Charge Coupled Device) in which R, G and B color filters of a predetermined color filter array (for example, a honeycomb array, a Bayer array) are provided. The imaging elements 122 and 123 receive subject lights formed by the focus lenses 12b and 13b, the zoom lenses 12c and 13c, and the like, and the lights entered to the light receiving surfaces are converted into signal charges of an amount depending on an incident light amount, by photodiodes arranged on the light receiving surfaces, respectively. Photo charge accumulation, transfer operations and an electronic shutter speed (photo charge accumulation time) in the imaging elements 122 and 123 are controlled by charge drain pulses inputted from the TGs 148 and 149, respectively.

In other words, if the charge drain pulses are inputted to the imaging elements 122 and 123, electric charges are not accumulated in the imaging elements 122 and 123 and are drained. On the other hand, when the charge drain pulses are not inputted to the imaging elements 122 and 123, the electric charges are not drained, and thus, electric charge accumulation, that is, exposure is started in the imaging elements 122 and 123. Imaging signals obtained by the imaging elements 122 and 123 are outputted to the CDS/AMPs 124 and 125, based on drive pulses given from the TGs 148 and 149, respectively.

The CDS/AMPs 124 and 125 perform a correlated double sampling process (a process for obtaining correct pixel data by calculating a difference between a feed-through component level and a pixel signal component level included in the output signal for each one pixel from the imaging element, for the purpose of mitigating noise (particularly, thermal noise) or the like included in the output signals from the imaging element) for the image signals outputted from the imaging elements 122 and 123, perform amplification, and generate R, G and B analog image signals.

The A/D converters 126 and 127 convert the R, G and B analog image signals generated by the CDS/AMPs 124 and 125, into digital image signals.

The image input controller 128 includes a line buffer of a predetermined capacity, and according to the command from the CPU 110, the image signal of one image outputted from the CDS/AMP/AD converter is accumulated and recorded in the VRAM 116.

The image signal processing device 130 includes a synchronization circuit (a processing circuit which interpolates spatial shifts in color signals which are associated with a single CCD color filter array, and converts the color signals into synchronous signals), a white balance correction circuit, a gamma correction circuit, a contour correction circuit, a luminance/color difference signal generation circuit and the like, and according to the command from the CPU 110, applies a required signal process to the inputted image signal, and generates image data (YUV data) including luminance data (Y data) and color difference data (Cr, Cb data).

The compression/expansion processing device 132 applies a compression process of a predetermined format, to the inputted image data, and generates compressed image data, according to the command from the CPU 110. Moreover, the inputted compressed image data is applied with an expansion process of a predetermined format, and uncompressed image data is generated, according to the command from the CPU 110.

The stereoscopic image signal processing unit 133 generates stereoscopic image data using image data for pieces of image data obtained via the right imaging system 12 and the left imaging system 13.

The video encoder 134 controls the display to the monitor 16. In other words, the image signal saved in the recording media 140 or the like is converted into a video signal (for example, an NTSC signal, a PAL signal or a SECAM signal) for being displayed on the monitor 16 (NTSC: National Television System Committee, PAL: Phase Alternation by Line, SECAM: Sequential Couleur A Memorie). Then, the video signal is outputted to the monitor 16. If needed, predetermined text and graphic information are also outputted to the monitor 16.

The media controller 136 records each image data applied with the compression process by the compression/expansion processing device 132, in the recording media 140.

To the audio input processing unit 138, an audio signal which has been inputted to the microphone 15 and amplified by a stereo microphone amplifier (not shown) is inputted, and the audio input processing unit 138 encodes this audio signal.

The recording media 140 are various recording media which are freely removable from the compound-eye digital camera 1, such as a semiconductor memory card represented by an xD Picture Card (registered trademark) and a Smart-Media (registered trademark), a portable small hard disk, a magnetic disk, an optical disk and a magnetic optical disk.

The focus lens driving units 142 and 143 move the focus lenses 12*b* and 13*b* in optical axis directions, respectively, and vary focus positions, according to the command from the CPU 110.

The zoom lens driving units 144 and 145 move the zoom lenses 12*c* and 13*c* in the optical axis directions, respectively, and vary focal lengths, according to the command from the CPU 110.

The mechanical shutters with apertures 12*d* and 13*d* are driven by iris motors of the aperture driving units 146 and 147, respectively, thereby vary aperture amounts thereof and adjust incident light amounts for the imaging elements 122 and 123.

The aperture driving units 146 and 147 vary the aperture amounts of the mechanical shutters with apertures 12*d* and 13*d*, and adjust the incident light amounts for the imaging elements 122 and 123, respectively, according to the command from the CPU 110. Moreover, the aperture driving units 146 and 147 open and close the mechanical shutters with apertures 12*d* and 13*d*, and perform the exposure/light shielding for the imaging elements 122 and 123, respectively, according to the command from the CPU 110.

Figure 3:
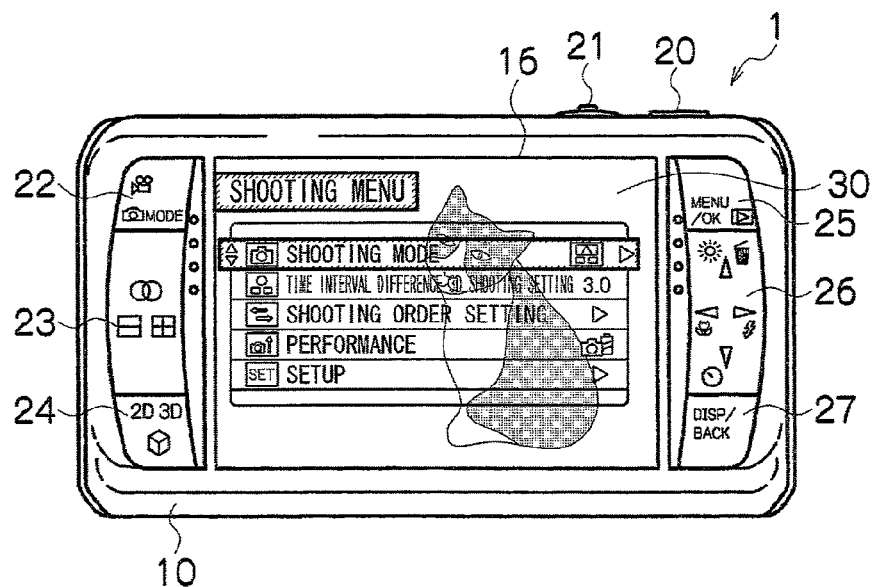
FIG. 3 is an example of a menu screen of the compound-eye digital camera 1.

Operations of the compound-eye digital camera 1 configured as above will be described. When the barrier 11 is slid from the closed state to the open state, the compound-eye digital camera 1 is powered on, and the compound-eye digital camera 1 starts in the shooting mode. As the shooting mode, the 2D shooting mode, and the 3D shooting mode for shooting a stereoscopic image of an identical subject viewed from the two viewpoints, can be set. Moreover, as the 3D shooting mode, a normal 3D shooting mode for using the right imaging system 12 and the left imaging system 13 simultaneously shooting the stereoscopic image with a predetermined parallax, and a 3D double shooting mode for shooting two images constituting the stereoscopic image, from different angles, in twice, and the like can be set. The setting of the shooting mode is performed as follows. The MENU/OK button 25 is depressed while the compound-eye digital camera 1 is driven in the shooting mode, and thereby, a menu screen 30 (see FIG. 3) is displayed on the monitor 16. On the menu screen 30, "shooting mode" is selected via the cross button 26 or the like, and thereby, a shooting mode menu screen 31 (see FIG. 4) is displayed on the monitor 16. Then, the setting can be performed from the shooting mode menu screen 31.

(1) 2D Shooting Mode

The CPU 110 selects the right imaging system 12 or the left imaging system 13 (the left imaging system 13 in the present embodiment), and starts to shoot a shooting confirmation image, with the imaging element 123 of the left imaging system 13. In other words, images are continuously imaged by the imaging element 123, and image signals thereof are continuously processed to generate image data for shooting confirmation image.

The CPU 110 sets the monitor 16 in 2D mode, sequentially inputs the generated image data to the video encoder 134. The video encoder 134 converts the image data into a signal format for the display and outputs the image data to the monitor 16. Thereby, the image captured by the imaging element 123 is displayed on the monitor 16. If the input to the monitor 16 accommodates a digital signal, the video encoder 134 is not required. However, conversion into a signal form in conforming to an input specification of the monitor 16 is required.

The user performs framing, confirms a subject whose image the user wants to shot, confirms the shot image, and sets a shooting condition, while watching the shooting confirmation image displayed on the monitor 16.

At the time of the shooting standby state, if the release switch 20 is half pressed, an S1ON signal is inputted to the CPU 110 (S1ON means that the release switch 20 has been half pressed). The CPU 110 senses the S1ON signal, and performs AE light metering and the AF control. At the time of the AE light metering, the brightness of the subject is metered based on the integration value and the like of the image signal captured via the imaging element 123. This metered value (photometric value) is used for deciding the aperture value of the mechanical shutter with aperture 13*d* and the shutter speed at the time of actual shooting. Simultaneously, based on the detected subject luminance, it is determined whether or not the light emission of the flash 14 is required. If it is determined that the light emission of the flash 14 is required, pre-light emission of the flash 14 is perforated, and a light emission amount of the flash 14 at the time of the actual shooting is decided based on reflected light of the pre-light emission.

When the release switch 20 is fully pressed, an S2ON signal is inputted to the CPU 110 (S2ON means that the release switch 20 has been fully pressed). In response to this S2ON signal, the CPU 110 executes the shooting and recording processes.

First, the CPU 110 drives the mechanical shutter with aperture 13*d* via the aperture driving unit 147 based on the aperture value decided based on the photometric value, and also controls the charge accumulation time (a so-called electronic shutter) in the imaging element 123 so that the shutter speed decided based on the photometric value is realized.

Moreover, at the time of the AF control, the CPU 110 performs the contrast AF. In the contrast AF, the CPU 110 makes the focus lens sequentially move to lens positions corresponding to the close range to the infinity, and obtains an evaluation value which is calculated by integrating a high-frequency component of the image signal of an AF area in the image captured via the imaging element 123 at each lens position from the AF detection device 118. Further, the CPU 110 obtains a lens position at which this evaluation value reaches a peak, and makes the focus lens move to the obtained lens position.

On this occasion, if the light emission of the flash 14 is performed, the light emission of the flash 14 is performed based on the light emission amount of the flash 14 obtained as a result of the pre-light emission.

The subject light enters the light receiving surface of the imaging element 123 via the focus lens 13*b*, the zoom lens 13*c*, the mechanical shutter with aperture 13*d*, an infrared cut filter (not shown in FIG. 2), an optical low-pass filter 48 (not shown in FIG. 2) and the like.

The signal charges accumulated in each photodiode of the imaging element 123 are read out according to a timing signal added from the TG 149, sequentially outputted as voltage signals (image signals) from the imaging element 123, and inputted to the CDS/AMP 125.

The CDS/AMP 125 performs the correlated double sampling process for a CCD output signal based on a CDS pulse, and amplifies the image signal outputted from a CDS circuit, with a gain for setting shooting sensitivity, which is added from the CPU 110.

The analog image signal outputted from the CDS/AMP 125 is converted into the digital image signal in the A/D converter 127, and this converted image signal (R, G and B RAW data) is transferred to the SDRAM 114, and temporarily stored in the SDRAM 114.

The R, G and B image signals read from the SDRAM 114 are inputted to the image signal processing device 130. In the image signal processing device 130, white balance adjustment is performed by applying a digital gain to each of the R, G and B image signals by the white balance adjustment circuit, a tone conversion process depending on gamma characteristics is performed by the gamma correction circuit, and a synchronization process for interpolating the spatial shifts in the color signals which are associated with the single CCD color filter array, and causing each color signal to be in phase, is performed by the synchronization circuit. Synchronized R, G and B image signals are further converted into a luminance signal Y and color difference signals Cr and Cb (YC signal) by a luminance/color difference data generation circuit, and are applied with a predetermined signal process such as contour enhancement. The YC signal processed in the image signal processing device 130 is stored in the SDRAM 114 again.

The YC signal stored in the SDRAM 114 as described above is compressed by the compression/expansion processing device 132, and is recorded as an image file in a predetermined format, in the recording media 140 via the media controller 136. Still image data is stored as an image file conforming to the Exif standard in the recording media 140. An Exif (Exchangeable image file format) file has a region which stores main image data, and a region which stores reduced image (thumbnail image) data. From the main image data obtained by the shooting, a thumbnail image of a defined size (for example, 160×120 or 80×60 pixels or the like) is generated through a pixel thinning process and other necessary data processing. The thumbnail image generated in this way is written with the main image into the Exif file. Moreover, tag information, such as shooting date and time, the shooting condition, and face detection information, is attached to the Exif file.

When the mode of the compound-eye digital camera 1 is set to a reproduction mode, the CPU 110 outputs a command to the media controller 136 to read the image file which has been recorded last in the recording media 140.

The compressed image data in the read image file is added to the compression/expansion processing device 132, expanded into uncompressed luminance/color difference signals, and then outputted via the video encoder 134 to the monitor 16. Thereby, the image recorded in the recording media 140 is reproduced and displayed on the monitor 16 (reproduction of one image). For the image shot in the 2D shooting mode, the plane image is displayed in the 2D mode on the entire screen of the monitor 16.

Frame advance of the image is performed by left and right key operations of the cross button 26, and if a right key of the cross button 26 is depressed, the next image file is read from the recording media 140, and reproduced and displayed on the monitor 16. Moreover, if a left key of the cross button is depressed, a previous image file is read from the recording media 140, and reproduced and displayed on the monitor 16.

While the image reproduced and displayed on the monitor 16 is confirmed, if needed, the image recorded in the recording media 140 can be erased. The erasure of the image is performed by depressing the MENU/OK button 25 in a state where the image is reproduced and displayed on the monitor 16.

(2) In Case where Normal 3D Shooting Mode is Set

The shooting for the shooting confirmation image is started by the imaging element 122 and the imaging element 123. In other words, the same (identical) subject is continuously imaged by the imaging element 122 and the imaging element 123, the image signals thereof are continuously processed, and stereoscopic image data for the shooting confirmation image is generated. The CPU 110 sets the monitor 16 in the 3D mode, and the generated image data is sequentially converted into the signal format for the display, and is outputted to the monitor 16, respectively, by the video encoder 134. Thereby, the stereoscopic image data for the shooting confirmation image is displayed on the monitor 16.

The user performs the framing, confirms the subject whose image the user desires to shot, confirms the shot image, and sets the shooting condition, while watching the shooting confirmation image displayed on the monitor 16.

At the time of the shooting standby state, if the release switch 20 is half pressed, the S1ON signal is inputted to the CPU 110. The CPU 110 senses the S1ON signal, and performs the AE light metering and the AF control. The AE light metering is performed by one of the right imaging system 12 and the left imaging system 13 (the left imaging system 13 in the present embodiment). Moreover, the AF control is performed by each of the right imaging system 12 and the left imaging system 13. Since the AE light metering and the AF control are the same as the 2D shooting mode, a detailed description thereof is omitted.

When the release switch 20 is fully pressed, the S2ON signal is inputted to the CPU 110. In response to this S2ON signal, the CPU 110 executes the shooting and recording processes. Since a process for generating the image data taken by each of the right imaging system 12 and the left imaging system 13 is the same as the 2D shooting mode, a description thereof is omitted.

From two pieces of the image data generated by the CDS/AMPs 124 and 125, respectively, two pieces of compressed image data are generated according to a method similar to the 2D shooting mode. The two pieces of compressed image data are associated with each other and stored as one file in the recording media 140. As a storage format, an MP format or the like can be used. The data is recorded in an associated state in the recording media 140.

When the mode of the compound-eye digital camera 1 is set to the reproduction mode, the CPU 110 outputs the command to the media controller 136 to read the image file which has been recorded last in the recording media 140.

The compressed image data in the read image file is added to the compression/expansion processing device 132, expanded into the uncompressed luminance/color difference signals, converted into the stereoscopic image by the stereoscopic image signal processing unit 133, and then outputted via the video encoder 134 to the monitor 16. Thereby, the image recorded in the recording media 140 is reproduced and displayed on the monitor 16 (the reproduction of one image). For the image shot in the 3D mode, the stereoscopic image is displayed in the 3D mode on the entire screen of the monitor 16.

The frame advance of the image is performed by the left and right key operations of the cross button 26, and if the right key of the cross button 26 is depressed, the next image file is read from the recording media 140, and reproduced and displayed on the monitor 16. Moreover, if the left key of the cross button is depressed, the previous image file is read from the recording media 140, and reproduced and displayed on the monitor 16.

While the image reproduced and displayed on the monitor 16 is confirmed, if needed, the image recorded in the recording media 140 can be erased. The erasure of the image is performed by depressing the MENU/OK button 25 in the state where the image is reproduced and displayed on the monitor 16.

(3) In Case where 3D Double Shooting Mode is Set

Figure 4:
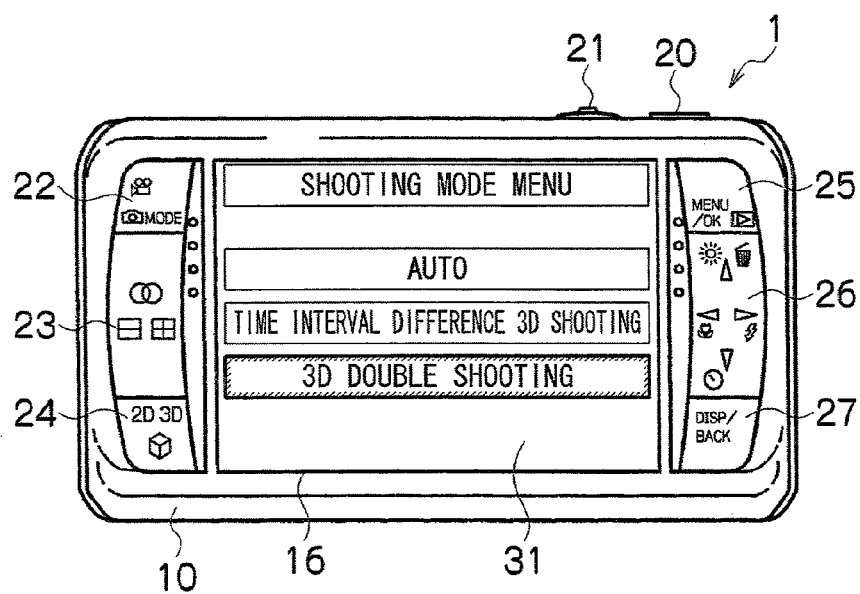
FIG. 4 is an example of a shooting mode menu screen of the compound-eye digital camera 1.
Figure 5:
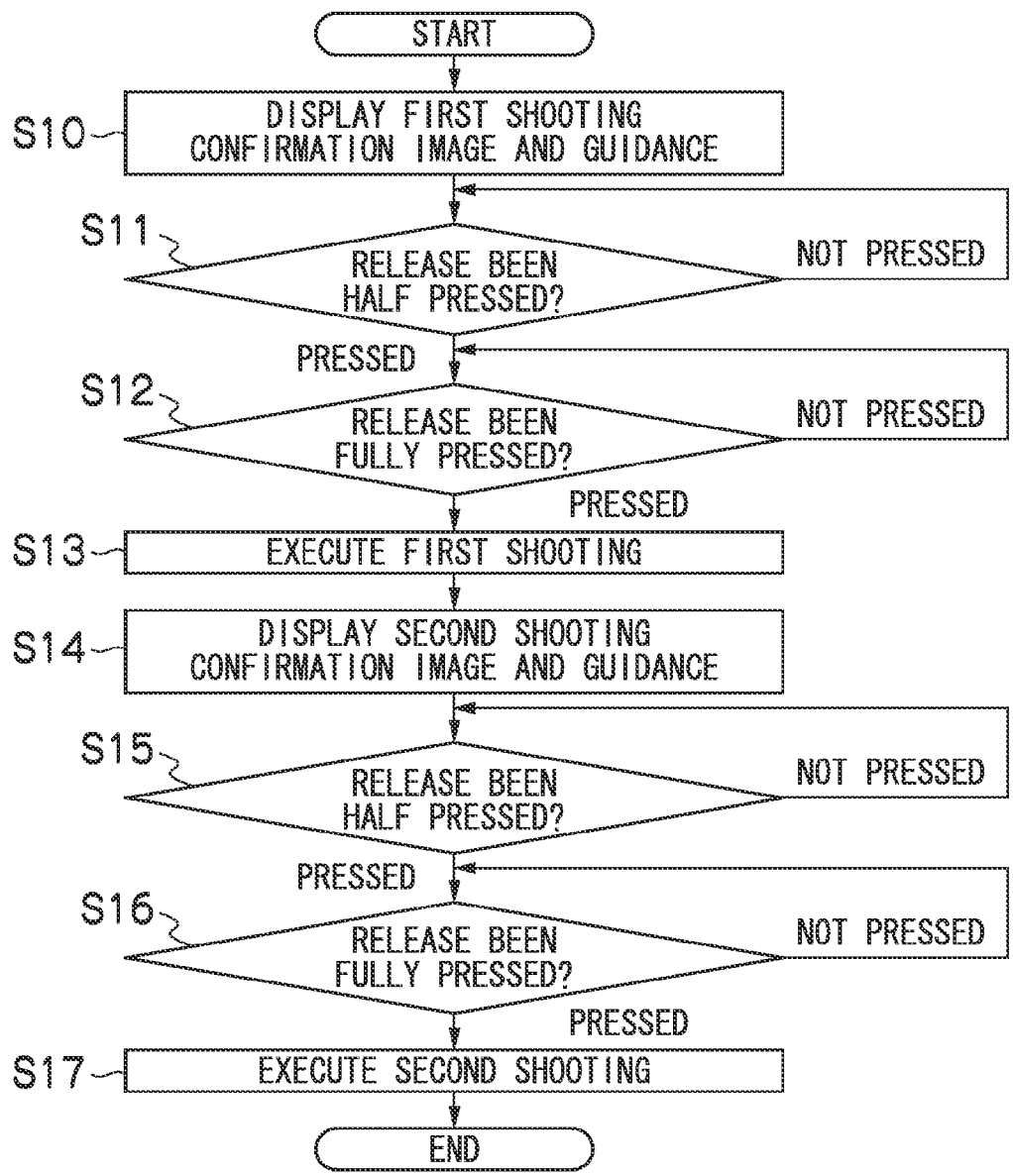
FIG. 5 is a flowchart showing a flow of a shooting process in a 3D double shooting mode in the compound-eye digital camera 1.

When "3D double shooting" is selected on the shooting mode menu screen shown in FIG. 4, via the cross button 26 or the like (in FIG. 4, "3D double shooting" is highlighted and displayed, and the MENU/OK button 25 is depressed), the compound-eye digital camera 1 is set in the 3D double shooting mode by the CPU 110. FIG. 5 is a flowchart showing a flow of a shooting process in the 3D double shooting mode. The process shown in FIG. 5 is mainly performed by the CPU 110.

Figure 6:
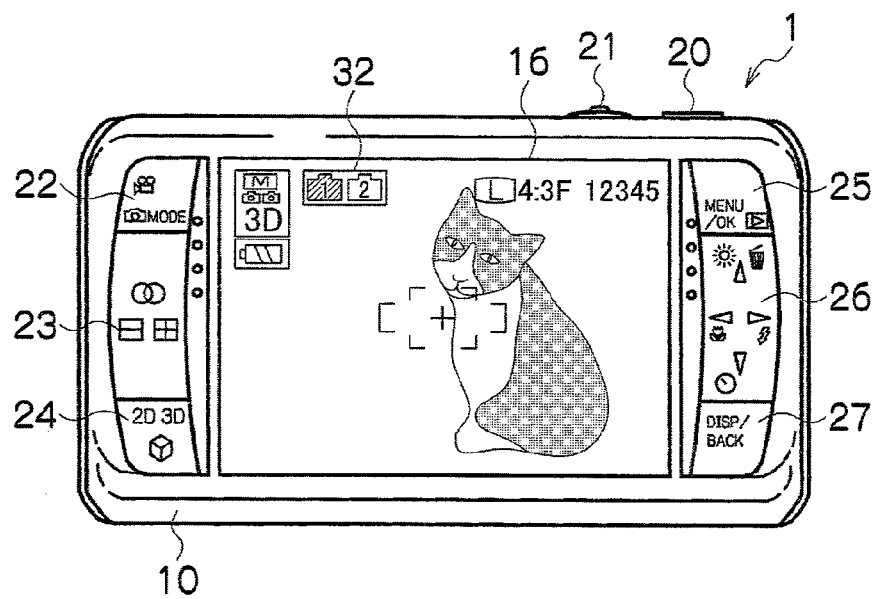
FIG. 6 is an example of a shooting confirmation screen in a shooting preparation phase for a first image in the compound-eye digital camera 1.

In the 3D double shooting mode of the present embodiment, the left imaging system 13 is used to take a first image, and the right imaging system 12 is used to take a second image. Therefore, the CPU 110 starts the shooting for the shooting confirmation image, with the imaging element 123. In other words, the subject is continuously imaged by the imaging element 123, the image signals thereof are continuously processed, and plane image data is generated. The CPU 110 sets the monitor 16 in the 2D mode, and displays this plane image data on the monitor 16. Along with the display, the CPU 110 displays guidance 32 indicating that the first image is shot by the left imaging system 13 and the second image is shot by the right imaging system 12, on the monitor 16 (step S10). Thereby, as shown in FIG. 6, the plane image data is displayed on the monitor 16, and the guidance 32 is also displayed on the monitor 16. Since this phase is during preparation for taking the first image, in order to indicate that the left imaging system 13 is used to take the first image, "1" of the guidance 32 is emphasized and displayed. Thereby, a photographer can recognize at a glance that the left imaging system 13 is used to take the first image.

The user performs the framing, confirms the subject whose image the user desires to shot, confirms the shot image, and sets the shooting condition, while watching the shooting confirmation image displayed on the monitor 16.

Figure 7:
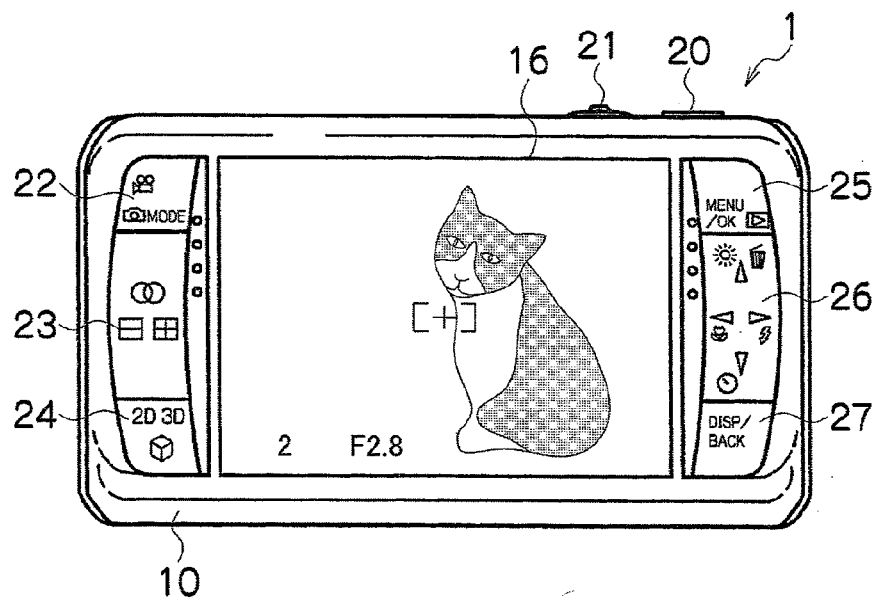
FIG. 7 is an example of a display screen at the time of focus lock in the compound-eye digital camera 1.

The CPU 110 determines whether or not the release switch 20 has been half pressed, that is, whether or not the S1ON signal has been inputted to the CPU 110 (step S11). If the release switch 20 has not been half pressed ("not pressed" in step S11), step S11 is performed again. If the release switch 20 has been half pressed ("pressed" in step S11), the CPU 110 senses the half pressing, and performs the AE light metering and the AF control for the left imaging system 13. Since the AE light metering and the AF control are the same as the 2D shooting mode, the detailed description thereof is omitted. If a focused state is set once, the CPU 110 stops lens driving of the focus lens 13*b* and performs focus lock. Then, as shown in FIG. 7, the CPU 110 displays the image captured in the focused state by the imaging element 123, on the monitor 16.

The CPU 110 determines whether or not the release switch 20 has been fully pressed, that is, whether or not the S2ON signal has been inputted to the CPU 110 (step S12). If the release switch 20 has not been fully pressed ("not pressed" in step S12), step S12 is performed again. If the release switch 20 has been fully pressed ("pressed" in step S12), in response to this S2ON signal, the CPU 110 uses the left imaging system 13 to execute the shooting process (step S13). Since the shooting process is the same as the 2D shooting mode, a description thereof is omitted.

Figure 8:
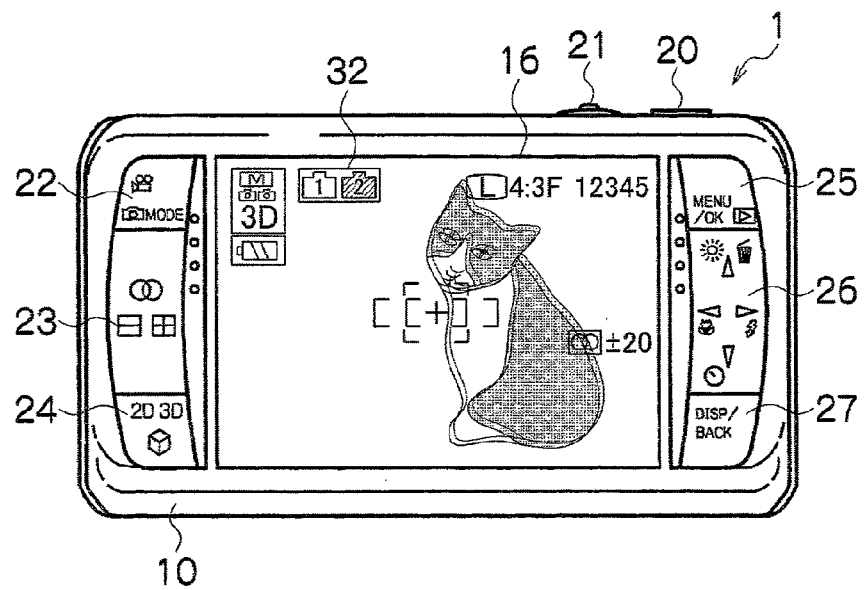
FIG. 8 is an example of the shooting confirmation screen in a shooting preparation phase for a second image in the compound-eye digital camera 1.

The CPU 110 starts the shooting for the shooting confirmation image, with the imaging element 122. In other words, the subject is continuously imaged by the imaging element 122, the image signals thereof are continuously processed, and the plane image data is generated. The CPU 110 sets the monitor 16 in the 2D mode, and performs semi-transparent display of this plane image data on the monitor 16. Along with the display, the CPU 110 displays the guidance 32 indicating that the first image is shot by the left imaging system 13 and the second image is shot by the right imaging system 12, on the monitor 16. Furthermore, the CPU 110 performs the semi-transparent display of the image shot in step S13, on the monitor 16 (step S14). Thereby, as shown in FIG. 8, the first image which has been already taken, and the shooting confirmation image for the second image to be shot next are displayed in a superimposed manner on the monitor 16, and the guidance 32 is also displayed on the monitor 16. Therefore, the photographer can confirm the two images constituting the stereoscopic image and then perform the shooting. Since this phase is during preparation for shooting the second image, in order to indicate that the right imaging system 12 is used to shot the second image, "2" of the guidance 32 is emphasized and displayed. Thereby, the photographer (user) can recognize at a glance that the right imaging system 12 is used to shot the second image.

The user performs the framing, confirms the subject whose image the user desires to shot, confirms the shot image, and sets the shooting condition, while watching the shooting confirmation image displayed on the monitor 16. Therefore, the photographer can take the image so that a preferred stereoscopic effect is realized, while confirming the taken image.

The CPU 110 determines whether or not the release switch 20 has been half pressed, that is, whether or not the S1ON signal has been inputted to the CPU 110 (step S15). If the release switch 20 has not been half pressed ("not pressed" in step S15), step S15 is performed again. If the release switch 20 has been half pressed ("pressed" in step S15), the CPU 110 senses the half pressing, and performs the AE light metering and the AF control for the right imaging system 12. Since the AE light metering and the AF control are the same as the 2D shooting mode, the detailed description thereof is omitted. If the focused state is set once, the CPU 110 stops the lens driving of the focus lens 12*b* and performs the focus lock. Then, the CPU 110 displays the image captured in the focused state by the imaging element 122, on the monitor 16.

The CPU 110 determines whether or not the release switch 20 has been fully pressed, that is, whether or not the S2ON signal has been inputted to the CPU 110 (step S16). If the release switch 20 has not been fully pressed ("not pressed" in step S16), step S16 is performed again. If the release switch 20 has been fully pressed ("pressed" in step S16), in response to this S2ON signal, the CPU 110 uses the right imaging system 12 to execute the shooting process (step S17). Since the shooting process is the same as step S13, the description thereof is omitted.

Thereby, two subject images constituting the stereoscopic image are formed on the imaging elements 122 and 123, and two pieces of image data are generated by the CDS/AMPs 124 and 125, respectively. The CPU 110 uses these two pieces of image data to generate the stereoscopic image. The CPU 110 sets the monitor 16 in the 3D mode, and as shown in FIG.

9, displays the generated stereoscopic image as a so-called post view on the monitor 16. Thereby, the shot stereoscopic image can be confirmed after shooting and before recording.

Figure 10:
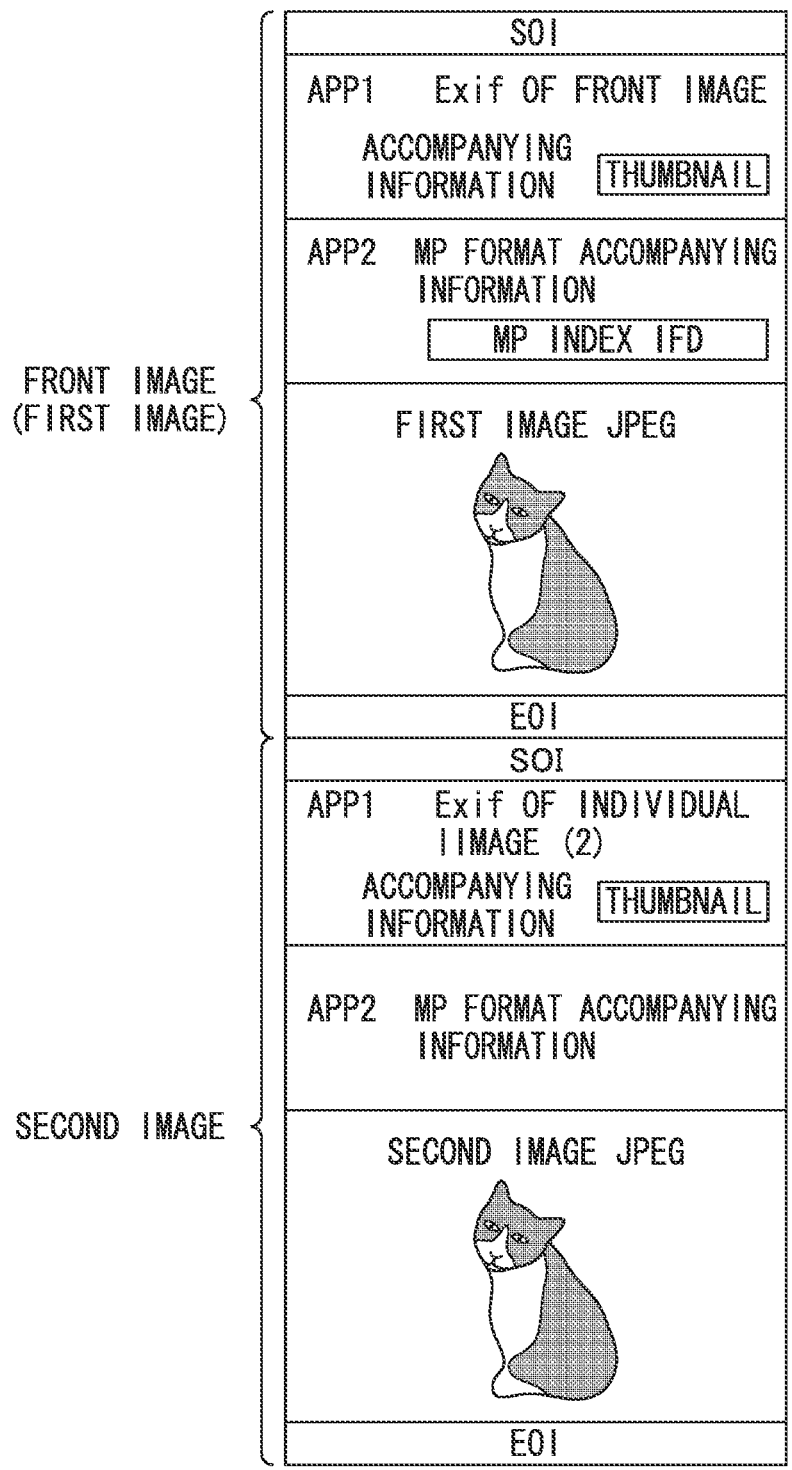
FIG. 10 is an example of a file configuration in which images are saved in the compound-eye digital camera 1.

According to the method similar to the 2D shooting mode, the CPU 110 generates the two pieces of compressed image data from the images shot in steps S13 and S17. The two pieces of image data are associated with each other and recorded as one file in the recording media 140. As the storage format, the MP format as shown in FIG. 10 or the like can be used. Thereby, even if the file is copied, moved or the like, the two images constituting the stereoscopic image are not separated. Therefore, even if the stereoscopic image is displayed by another display apparatus, these two images can be used to display the stereoscopic image.

When the mode of the compound-eye digital camera 1 is set to the reproduction mode, the CPU 110 displays the stereoscopic image on the monitor 16, similarly to the image shot in a normal 3D mode. Since a process for reproducing the image and a process for erasing the image are similar to the normal 3D mode, a description thereof is omitted.

According to the present embodiment, the stereoscopic image with the predetermined parallax can be automatically taken, and the stereoscopic image with an arbitrary parallax can also be taken based on selection made by the photographer.

Moreover, according to the present embodiment, when the second image is taken, the first image is displayed in a semi-transparent manner with the second shooting confirmation image, and therefore, the stereoscopic image with a stereoscopic effect desired by the photographer can be shot.

Moreover, according to the present embodiment, since the two images are saved in one file, the two images can be prevented from being separated, and the generation of the stereoscopic image can be prevented from becoming impossible.

Moreover, according to the present embodiment, there is displayed the emphasized and displayed guidance 32 indicating that the first image is shot by the left imaging system 13 and the second image is shot by the right imaging system 12, and indicating whether the first image is being taken or the second image is being taken. Therefore, the photographer can recognize at a glance which imaging system is used to perform the shooting.

Figure 11A:
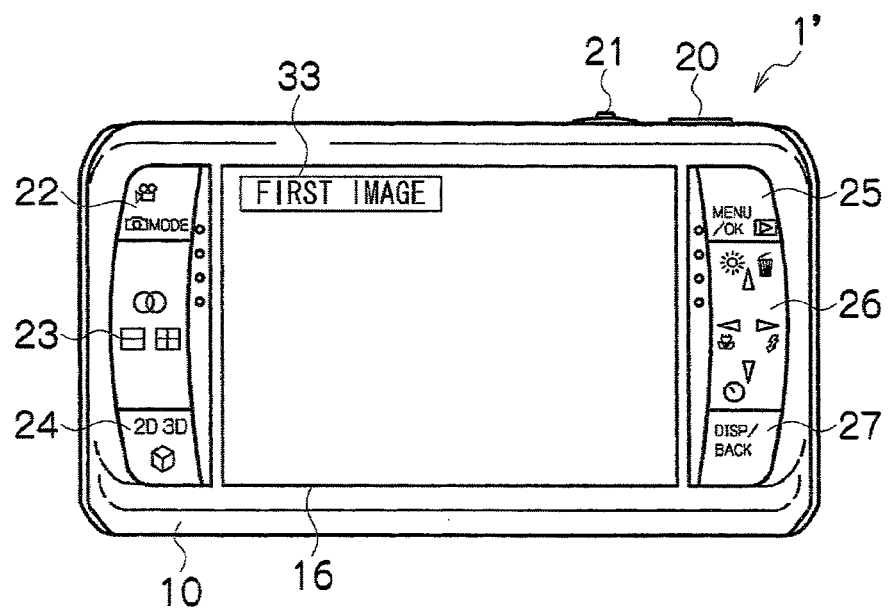
FIGS. 11A and 11B are examples of the shooting confirmation screen of a compound-eye digital camera 1'.
Figure 11B:
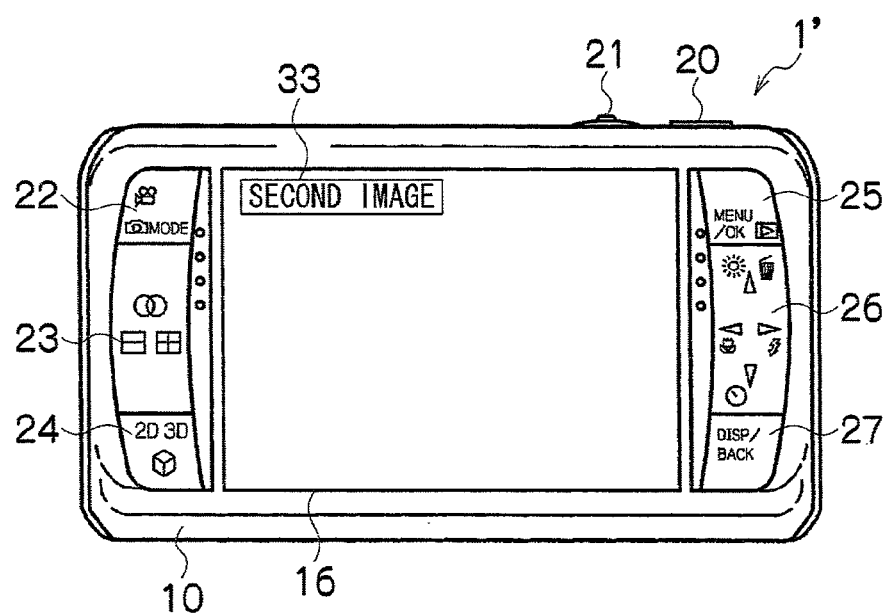

It should be noted that, in the present embodiment, while the guidance 32 indicating that the first image is shot by the left imaging system 13 and the second image is shot by the right imaging system 12, is displayed as shown in FIGS. 6 and 8, the guidance is not limited thereto as long as the guidance indicates that the first image is shot by the left imaging system 13 and the second image is shot by the right imaging system 12. For example, as shown in FIG. 11, text such as "first image" and "second image" may be displayed as the guidance 33.

<Second Embodiment>

A second embodiment of the presently disclosed subject matter is a mode in which a self-timer is used to perform the 3D double shooting. A compound-eye digital camera 2 of the second embodiment will be described below. Since the compound-eye digital camera 2 is the same as the compound-eye digital camera 1 except the shooting process in the 3D double shooting mode, only the shooting process in the 3D double shooting mode will be described. Moreover, the same portions as those of the first embodiment are assigned with the same reference numerals, and descriptions thereof are omitted.

Figure 12:
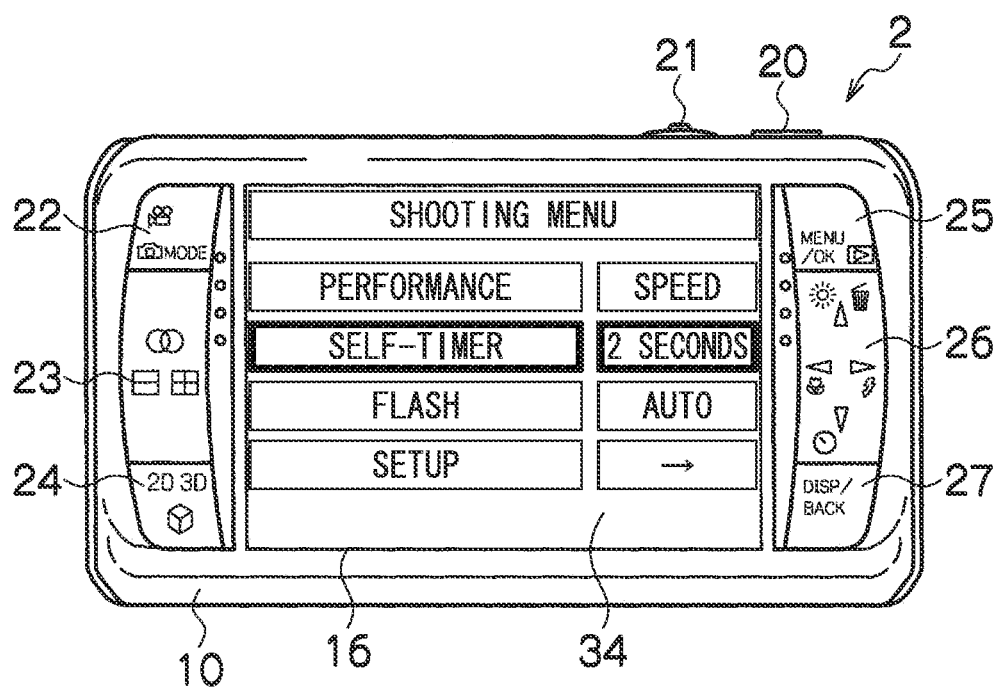
FIG. 12 is an example of the menu screen of a compound-eye digital camera 2 according to a second embodiment of the presently disclosed subject matter.

The present embodiment is performed if a self-timer function is enabled by the photographer. The enabling of the self-timer function and setting of the time of the self-timer are performed as follows. The MENU/OK button 25 is depressed while the compound-eye digital camera 2 is driven in the shooting mode, and thereby, a menu screen 34 (see FIG. 12) is displayed on the monitor 16. On the menu screen 34, "self-timer" is selected via the cross button 26 or the like (in FIG. 12, "self-timer" is highlighted and displayed, and the MENU/OK button 25 is depressed), and the time of the self-timer is selected. For example, 2, 5 or 10 seconds can be selected as the time of the self-timer, and in the present embodiment, "2 seconds" is selected (in FIG. 12, "2 seconds" is highlighted and displayed, and the MENU/OK button 25 is depressed). Set information is recorded in the SDRAM 114. It should be noted that the enabling of the self-timer function and the setting of the time of the self-timer can also be performed by depressing the down button of the cross button 26 while the compound-eye digital camera 2 is driven in the shooting mode.

Figure 13:
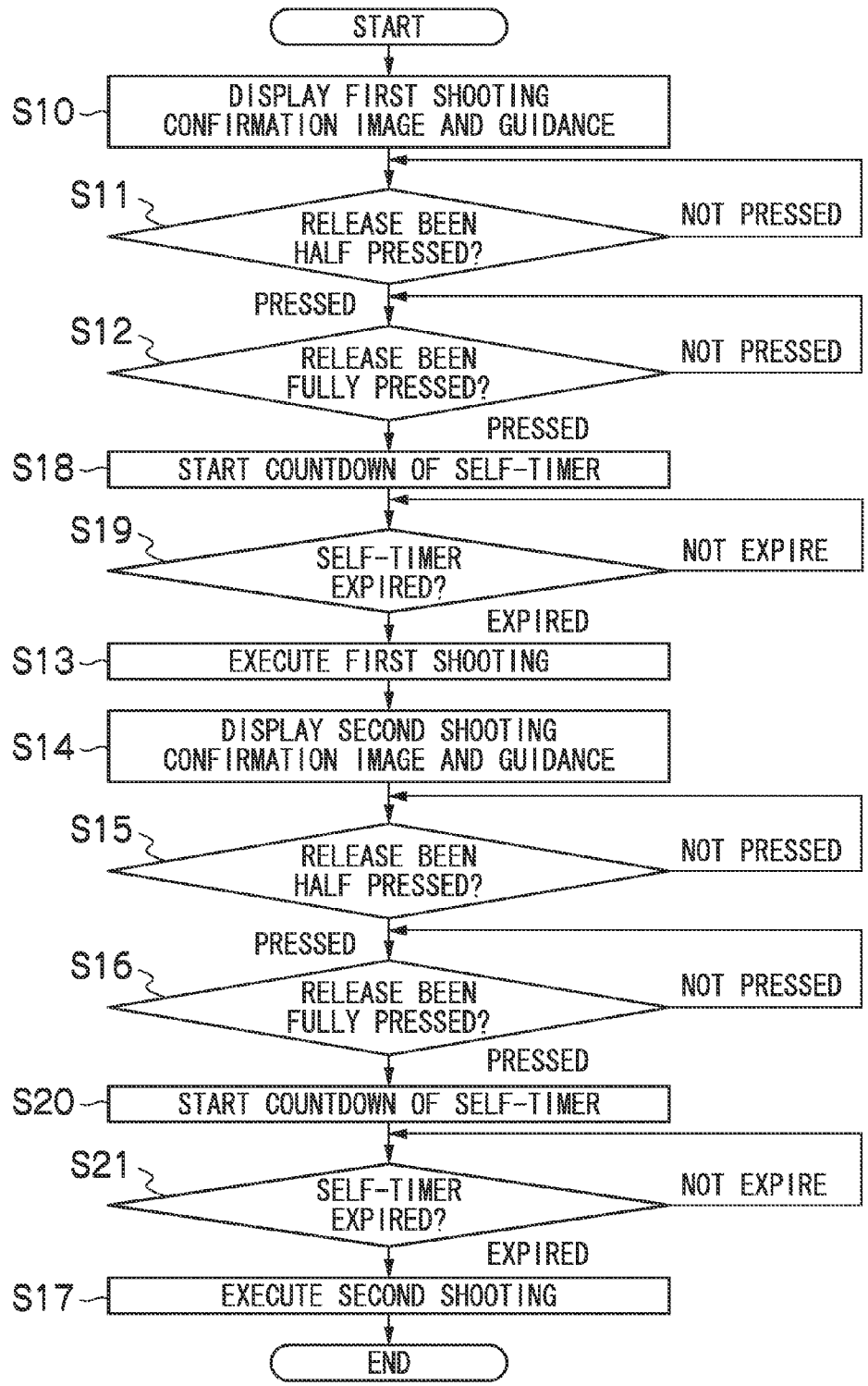
FIG. 13 is a flowchart showing the flow of the shooting process in the 3D double shooting mode in the compound-eye digital camera 2.

FIG. 13 is a flowchart showing the flow of the shooting process in the 3D double shooting mode in the compound-eye digital camera 2. The CPU 110 takes the image for the shooting confirmation, by the imaging element 123, displays the image on the monitor 16, and also displays the guidance 32 which indicates that the first image is shot by the left imaging system 13 and the second image is shot by the right imaging system 12, and in which "1" is emphasized and displayed, on the monitor 16 (step S10).

The user performs the framing, confirms the subject whose image the user desires to shot, confirms the shot image, and sets the shooting condition, while watching the shooting confirmation image displayed on the monitor 16.

The CPU 110 determines whether or not the release switch 20 has been half pressed, that is, whether or not the S1ON signal has been inputted to the CPU 110 (step S11). If the release switch 20 has not been half pressed ("not pressed" in step S11), step S11 is performed again. If the release switch 20 has been half pressed ("pressed" in step S11), the CPU 110 senses the half pressing, and performs the AE light metering and the AF control for the left imaging system 13.

Figure 14A:
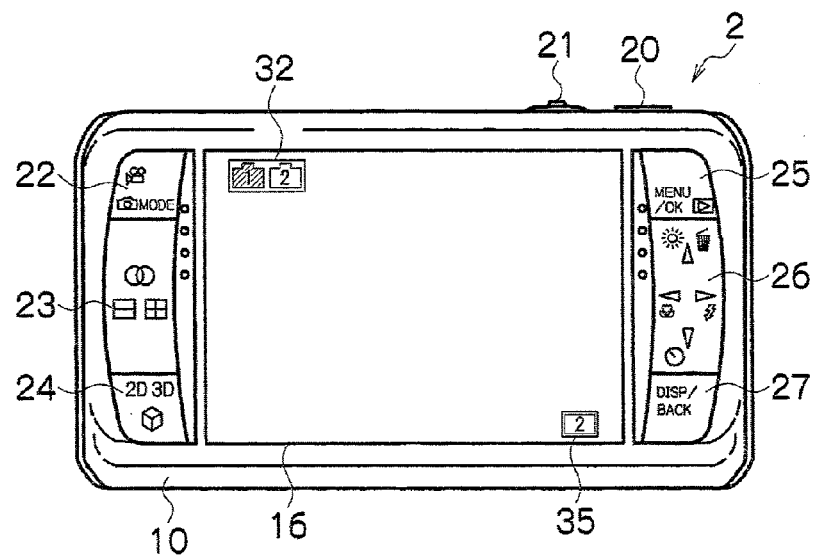
FIGS. 14A and 14B are examples of the shooting confirmation screen of the compound-eye digital camera 2.

The CPU 110 determines whether or not the release switch 20 has been fully pressed, that is, whether or not the S2ON signal has been inputted to the CPU 110 (step S12). If the release switch 20 has not been fully pressed ("not pressed" in step S12), step S12 is performed again. If the release switch 20 has been fully pressed ("pressed" in step S12), the CPU 110 displays guidance 35 indicating that the self-timer has been set to two seconds, on the monitor 16 as shown in FIG. 14A, and also starts countdown of the self-timer (step S18). Along with the countdown of the self-timer, the CPU 100 displays the guidance 35 while decreasing the display of the guidance 35 like "2", "1".

The CPU 110 determines whether or not a count of the self-timer has become "0", that is, whether or not a period of the self-timer has expired (step S19). If the period of the self-timer has not expired ("not expire" in step S19), step S19 is performed again. If the period of the self-timer has expired ("expired" in step S19), the CPU 110 uses the left imaging system 13 to execute the shooting process (step S13).

The CPU 110 performs the semi-transparent display of the image shot by the imaging element 123 in step S13, on the monitor 16, and also takes the shooting confirmation image by the imaging element 122, and performs the semi-transparent display of the shooting confirmation image on the monitor 16. Moreover, the CPU 110 displays the guidance 32 which indicates that the first image is shot by the left imaging system 13 and the second image is shot by the right imaging system 12, and in which "2" is emphasized and displayed, on the monitor 16 (step S14).

The CPU 110 determines whether or not the release switch 20 has been half pressed, that is, whether or not the S1ON signal has been inputted to the CPU 110 (step S15). If the release switch 20 has not been half pressed ("not pressed" in step S15), step S15 is performed again. If the release switch 20 has been half pressed ("pressed" in step S15), the CPU 110 senses the half pressing, and performs the AE light metering and the AF control for the right imaging system 12.

Figure 14B:
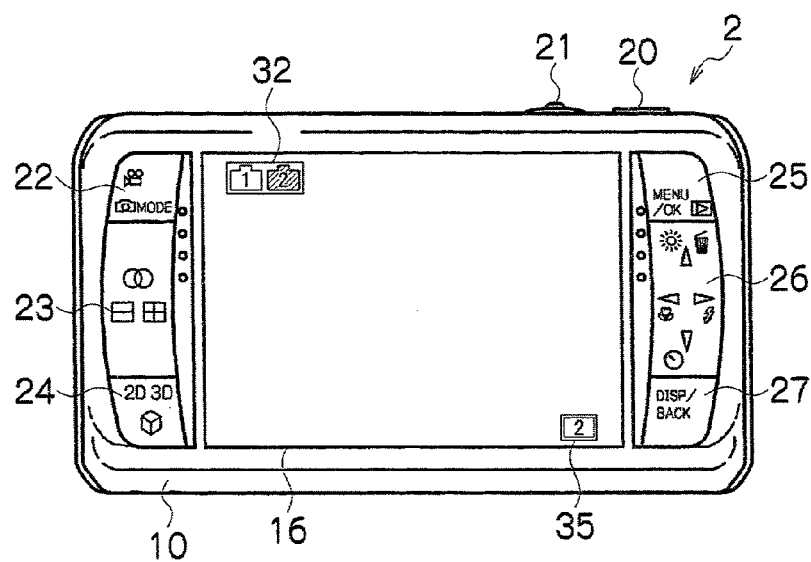

The CPU 110 determines whether or not the release switch 20 has been fully pressed, that is, whether or not the S2ON signal has been inputted to the CPU 110 (step S16). If the release switch 20 has not been fully pressed ("not pressed" in step S16), step S16 is performed again. If the release switch 20 has been fully pressed ("pressed" in step S16), the CPU 110 displays the guidance 35 indicating that the self-timer has been set to two seconds, on the monitor 16 as shown in FIG. 14B, and also starts the countdown of the self-timer (step S20). Along with the countdown of the self-timer, the CPU 100 displays the guidance 35 while decreasing the display of the guidance 35 like "2" to "1".

The CPU 110 determines whether or not the count of the self-timer has become "0", that is, whether or not the period of the self-timer has expired (step S21). If the period of the self-timer has not expired ("not expire" in step S21), step S21 is performed again. If the period of the self-timer has expired ("expired" in step S21), the CPU 110 uses the right imaging system 12 to execute the shooting process (step S17).

Figure 9:
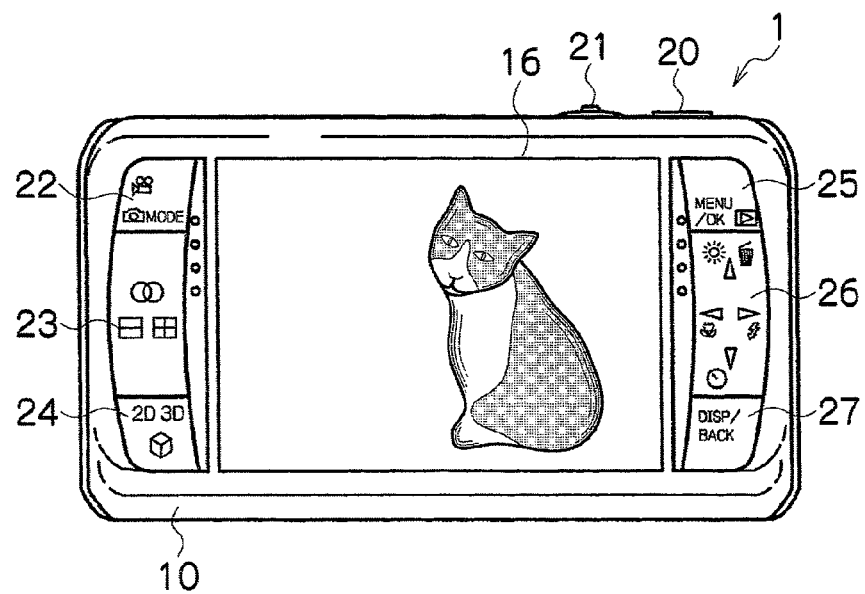
FIG. 9 is an example of a post view screen of the compound-eye digital camera 1.

Thereby, the two subject images constituting the stereoscopic image are formed on the imaging elements 122 and 123, and the two pieces of image data are generated by the CDS/AMPs 124 and 125, respectively. The CPU 110 uses these two pieces of image data to generate the stereoscopic image. The CPU 110 sets the monitor 16 in the 3D mode, and as shown in FIG. 9, displays the generated stereoscopic image as the so-called post view on the monitor 16. Thereby, the shot stereoscopic image can be confirmed after shooting and before recording.

According to the present embodiment, since the self-timer function is used, a timing of the shooting and a timing of the depression of the release switch are different, and therefore, camera shake which occurs when the image is shot can be prevented.

<Third Embodiment>

A third embodiment of the presently disclosed subject matter is a mode in which cancellation of the shooting can be accepted in the 3D double shooting mode. A compound-eye digital camera 3 of the third embodiment will be described below. Since the compound-eye digital camera 3 is the same as the compound-eye digital camera 1 except the shooting process in the 3D double shooting mode, only the shooting process in the 3D double shooting mode will be described. Moreover, the same portions as those of the first embodiment or the second embodiment are assigned with the same reference numerals, and descriptions thereof are omitted.

FIG. 15 is a flowchart showing the flow of the shooting process in the 3D double shooting mode in the compound-eye digital camera 3. The CPU 110 takes the shooting confirmation image by the imaging element 123, displays the shooting confirmation image on the monitor 16, and also displays the guidance 32 which indicates that the first image is shot by the left imaging system 13 and the second image is shot by the right imaging system 12, and in which "1" is emphasized and displayed, on the monitor 16 (step S10).

The CPU 110 determines whether or not the release switch 20 has been half pressed, that is, whether or not the S1ON signal has been inputted to the CPU 110 (step S11). If the release switch 20 has not been half pressed ("not pressed" in step S11), step S11 is performed again. If the release switch 20 has been half pressed ("pressed" in step S11), the CPU 110 senses the half pressing, and performs the AE light metering and the AF control for the left imaging system 13.

Figure 16:
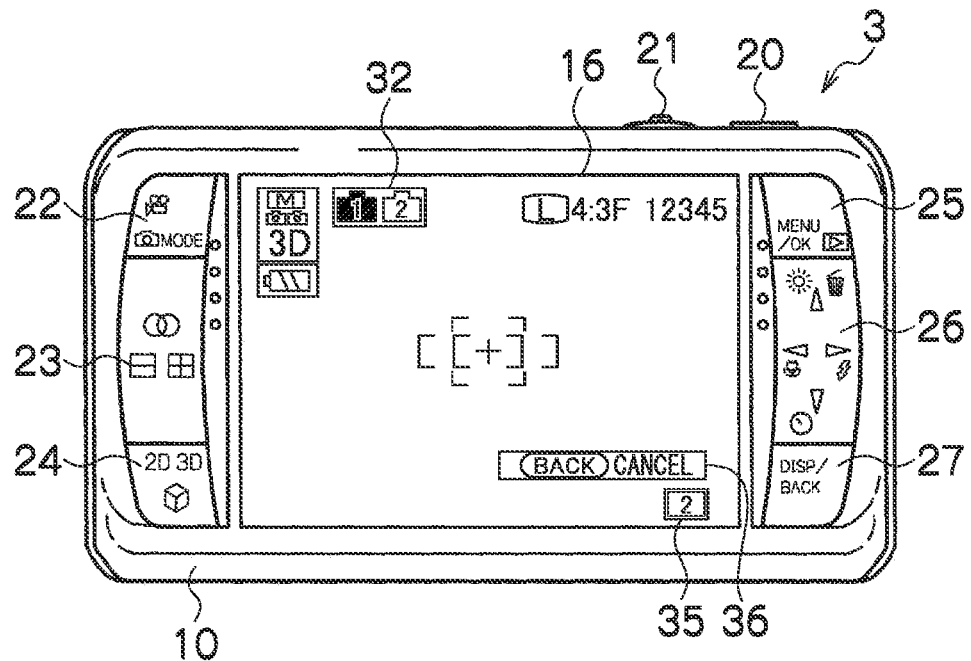
FIG. 16 is an example of the display screen after S1 is inputted in shooting the first image in the compound-eye digital camera 3 (S1 means the release switch 20 has been half pressed)

The CPU 110 determines whether or not the release switch 20 has been fully pressed, that is, whether or not the S2ON signal has been inputted to the CPU 110 (step S12). If the release switch 20 has not been fully pressed ("not pressed" in step S12), step S12 is performed again. If the release switch 20 has been fully pressed ("pressed" in step S12), the CPU 110 displays the guidance 35 indicating that the self-timer has been set to two seconds, on the monitor 16 as shown in FIG. 16, and also starts the countdown of the self-timer. Moreover, the CPU 110 displays guidance 36 indicating that the cancellation of the shooting is enabled in the 3D double shooting mode, as shown in FIG. 16 (step S22). In the present embodiment, when a screen shown in FIG. 16 is displayed, if the DISP/BACK button 27 is depressed, the shooting is canceled.

The CPU 100 determines whether or not the cancellation of the shooting has been inputted, that is, whether or not the DISP/BACK button 27 has been depressed (step S23). If the cancellation of the shooting has been inputted ("inputted" in step S23), the CPU 100 stops the shooting process, and takes an image for shooting confirmation of a first image (first shooting confirmation image) (step S10).

If the cancellation of the shooting has not been inputted ("not inputted" in step S23), the CPU 110 determines whether or not the count of the self-timer has become "0", that is, whether or not the period of the self-timer has expired (step S19). If the period of the self-timer has not expired ("not expire" in step S19), step S19 is performed again. If the period of the self-timer has expired ("expired" in step S19), the CPU 110 uses the left imaging system 13 to execute the shooting process (step S13).

The CPU 110 performs the semi-transparent display of the image shot by the imaging element 123 in step S13, on the monitor 16, and also takes an image for shooting confirmation of a second image (second shooting confirmation image) by the imaging element 122, and performs the semi-transparent display of the second shooting confirmation image on the monitor 16. Moreover, the CPU 110 displays the guidance 32 which indicates that the first image is shot by the left imaging system 13 and the second image is shot by the right imaging system 12, and in which "2" is emphasized and displayed, on the monitor 16 (step S14).

The CPU 110 determines whether or not the release switch 20 has been half pressed, that is, whether or not the S1ON signal has been inputted to the CPU 110 (step S15). If the release switch 20 has not been half pressed ("not pressed" in step S15), step S15 is performed again. If the release switch 20 has been half pressed ("pressed" in step S15), the CPU 110 senses the half pressing, and performs the AE light metering and the AF control for the right imaging system 12.

Figure 17:
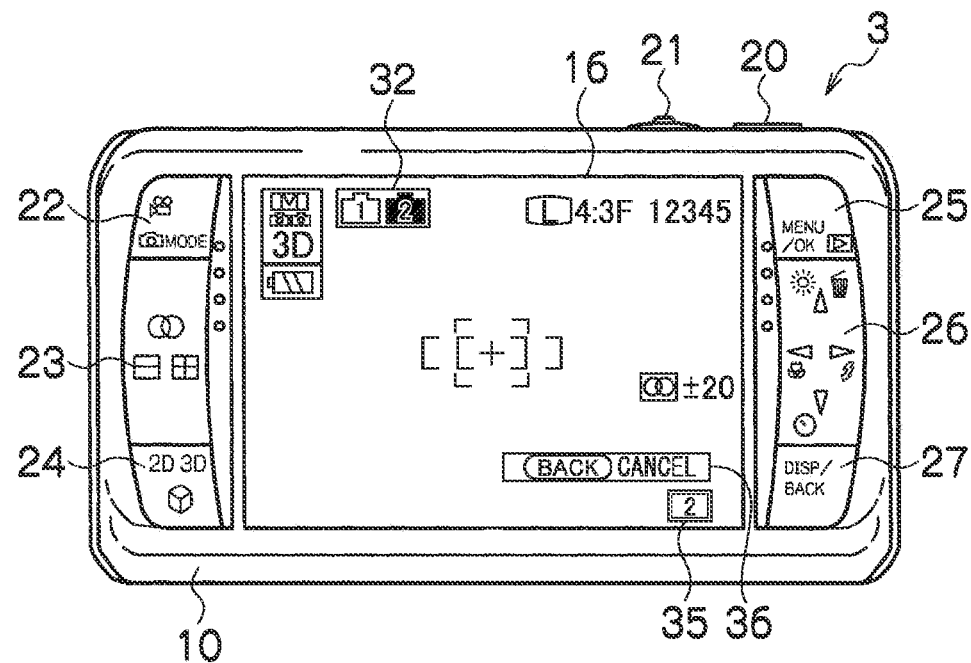
FIG. 17 is an example of the display screen after S1 is inputted in shooting the second image in the compound-eye digital camera 3.

The CPU 110 determines whether or not the release switch 20 has been fully pressed, that is, whether or not the S2ON signal has been inputted to the CPU 110 (step S16). If the release switch 20 has not been fully pressed ("not pressed" in step S16), step S16 is performed again. If the release switch 20 has been fully pressed ("pressed" in step S16), the CPU 110 displays the guidance 35 indicating that the self-timer has been set to two seconds, on the monitor 16 as shown in FIG. 17, and also starts the countdown of the self-timer. Moreover, the CPU 110 displays the guidance 36 indicating that the cancellation of the shooting is enabled in the 3D double shooting mode, as shown in FIG. 17 (step S24).

The CPU 100 determines whether or not the cancellation of the shooting has been inputted, that is, whether or not the DISP/BACK button 27 has been depressed (step S25). If the cancellation of the shooting has been inputted ("inputted" in step S25), the CPU 100 stops the shooting process, and takes the first shooting confirmation image (step S10), because the stereoscopic viewing may not often be performed well, that is, composition of the first image may often be inappropriate, when the shooting is canceled in a second shooting phase.

If the cancellation of the shooting has not been inputted ("not inputted" in step S25), the CPU 110 determines whether or not the count of the self-timer has become "0", that is, whether or not the period of the self-timer has expired (step S21). If the period of the self-timer has not expired ("not expire" in step S21), step S21 is performed again. If the period of the self-timer has expired ("expired" in step S21), the CPU 110 uses the right imaging system 12 to execute the shooting process (step S17).

Thereby, the two subject images constituting the stereoscopic image are formed on the imaging elements 122 and 123, and the two pieces of image data are generated by the CDS/AMPs 124 and 125, respectively. The CPU 110 uses these two pieces of image data to generate the stereoscopic image. The CPU 110 sets the monitor 16 in the 3D mode, and as shown in FIG. 9, displays the generated stereoscopic image as the so-called post view on the monitor 16. Thereby, the shot stereoscopic image can be confirmed after shooting and before recording.

According to the present embodiment, if the photographer is not satisfied with a result of the shooting, the composition can be changed.

It should be noted that, in the present embodiment, if the release switch 20 has been fully pressed and the cancellation of the shooting has been inputted during the countdown of the self-timer (steps S23 and S25), the shooting process is stopped and the first shooting confirmation image is taken (step S10). However, a timing at which the cancellation of the shooting can be inputted is not limited thereto. For example, the input of the cancellation of the shooting may be accepted and the shooting may be canceled while the shooting confirmation image is displayed (steps S10 and S14). Moreover, the input of the cancellation of the shooting may be accepted and the shooting may be canceled after the release switch 20 has been half pressed (steps S11 and S15) and before the release switch 20 is fully pressed (steps S12 and S16).

<Fourth Embodiment>

A fourth embodiment of the presently disclosed subject matter is a mode in which it is possible for the photographer to set which imaging system is used to perform the shooting first. A compound-eye digital camera 4 of the fourth embodiment will be described below. Since the compound-eye digital camera 4 is the same as the compound-eye digital camera 1 except the shooting process in the 3D double shooting mode, only the shooting process in the 3D double shooting mode will be described. Moreover, the same portions as those of the first embodiment to the third embodiment are assigned with the same reference numerals, and descriptions thereof are omitted.

Figure 18A:
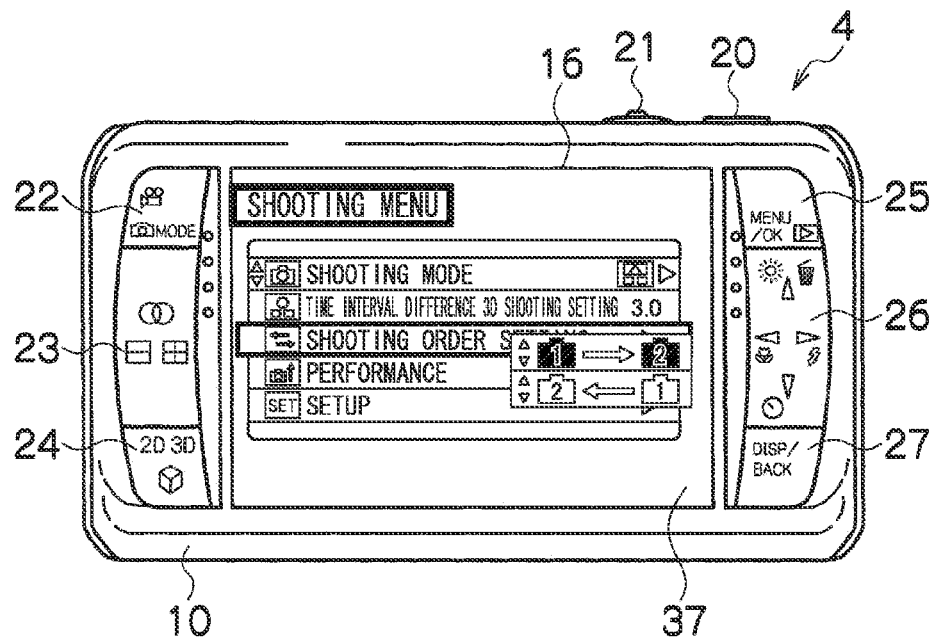
FIGS. 18A and 18B are examples of the menu screen of a compound-eye digital camera 4 according to a fourth embodiment of the presently disclosed subject matter.
Figure 18B:
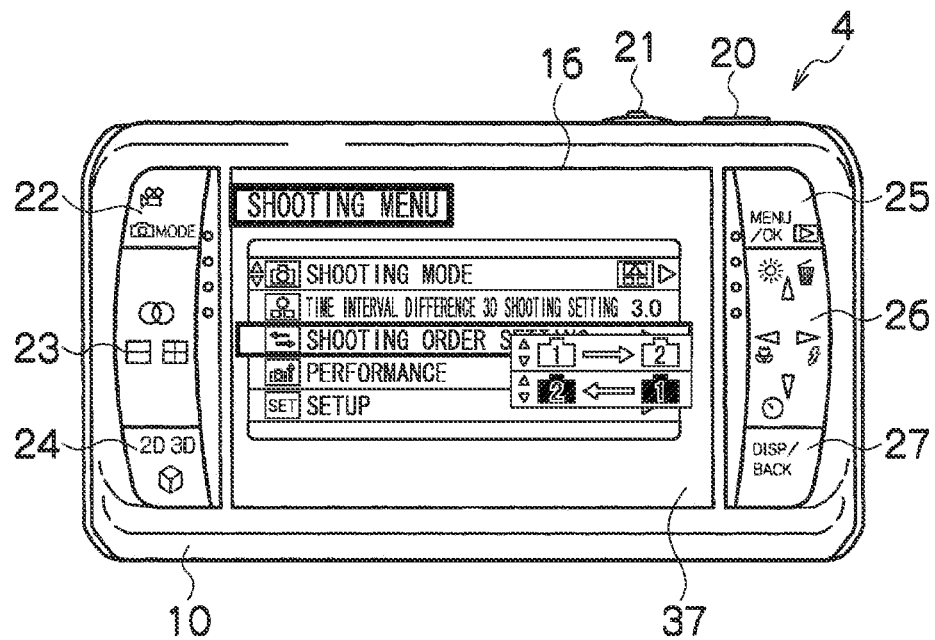

In the present embodiment, the photographer can set which imaging system is used to perform the shooting first (a shooting order). The setting of the shooting order is performed as follows. The MENU/OK button 25 is depressed while the compound-eye digital camera 4 is driven in the shooting mode, and thereby, a menu screen 37 (see FIGS. 18A and 18B) is displayed on the monitor 16. On the menu screen 37, "shooting order setting" is selected via the cross button 26 or the like (in FIGS. 18A and 18B, "shooting order setting" is highlighted and displayed, and the MENU/OK button 25 is depressed). As shown in FIG. 18A, if "1→2" is selected (in FIG. 18A, "1→2" is highlighted and displayed, and the MENU/OK button 25 is depressed), the first image is set to be shot by the left imaging system 13, and the second image is set to be shot by the right imaging system 12. As shown in FIG. 18B, if "2←1" is selected (in FIG. 18B, "2←1" is highlighted and displayed, and the MENU/OK button 25 is depressed), the first image is set to be shot by the right imaging system 12, and the second image is set to be shot by the left imaging system 13. Set information is recorded in the SDRAM 114.

Figure 19:
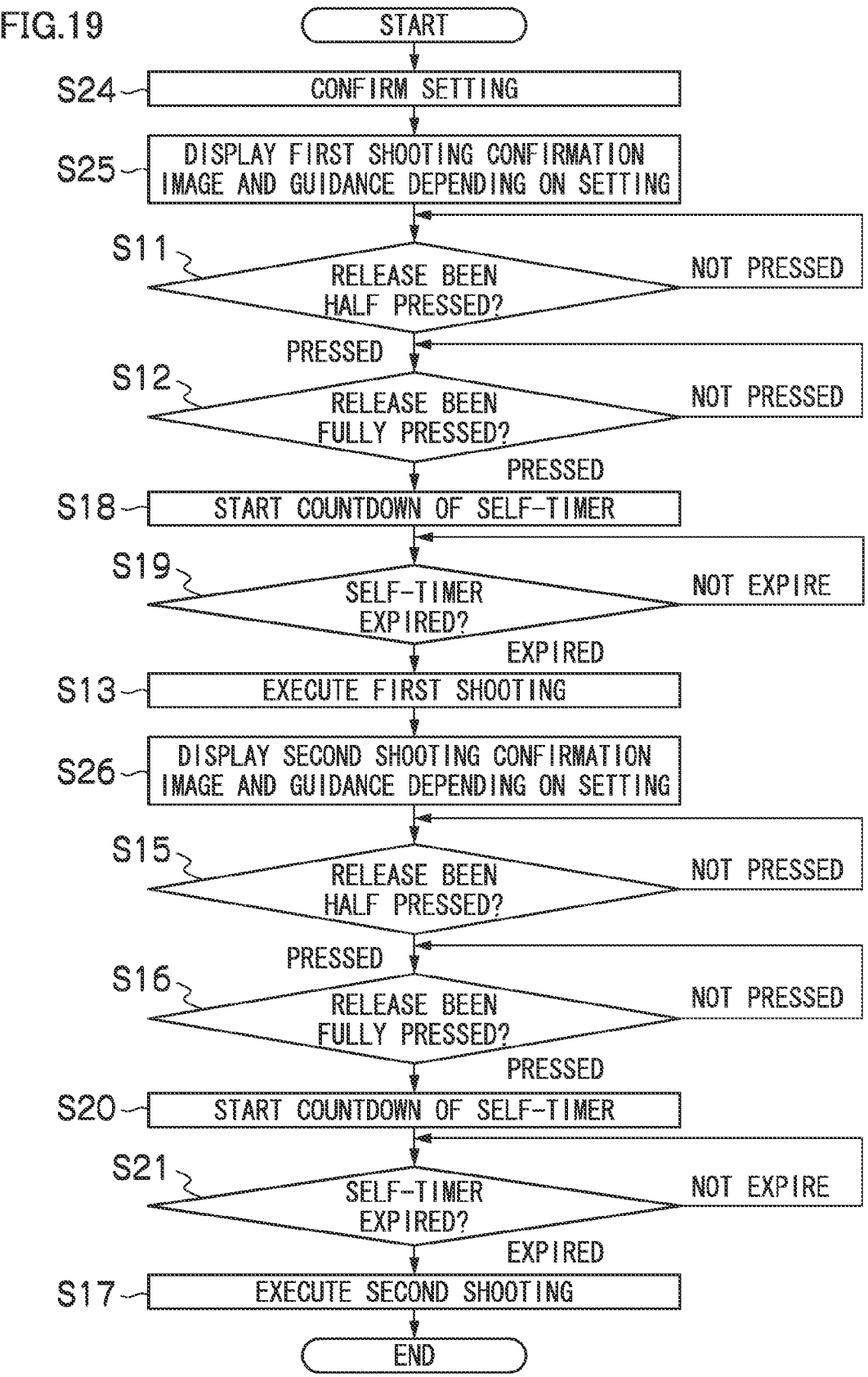
FIG. 19 is a flowchart showing the flow of the shooting process in the 3D double shooting mode in the compound-eye digital camera 4.

FIG. 19 is a flowchart showing the flow of the shooting process in the 3D double shooting mode in the compound-eye digital camera 4. Prior to the shooting process, the CPU 110 obtains the information on the shooting order stored in the SDRAM 114 (step S24).

Figure 20A:
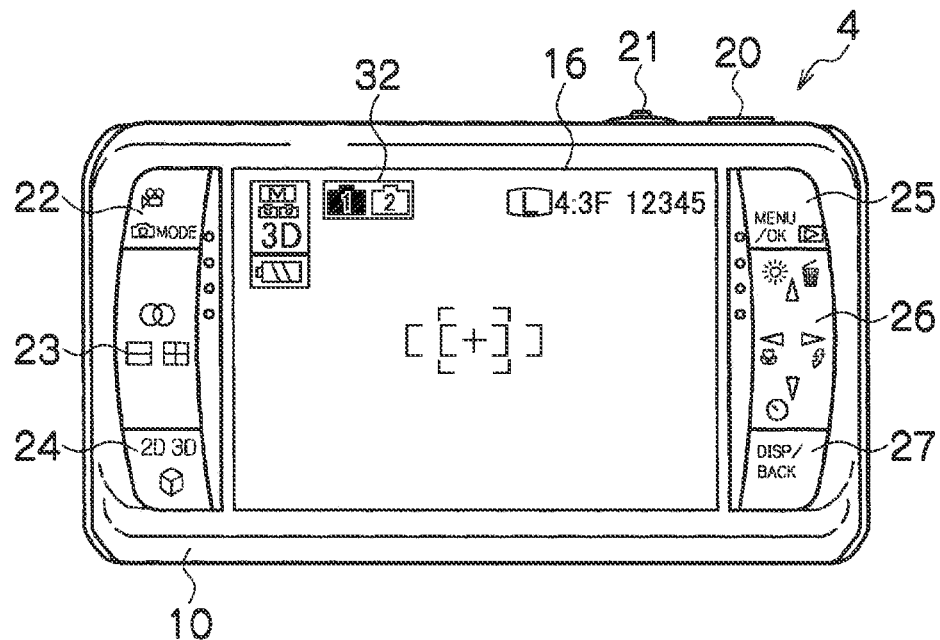
FIGS. 20A and 20B are examples of the shooting confirmation screen in the shooting preparation phase for a first image in the compound-eye digital camera 4.
Figure 20B:
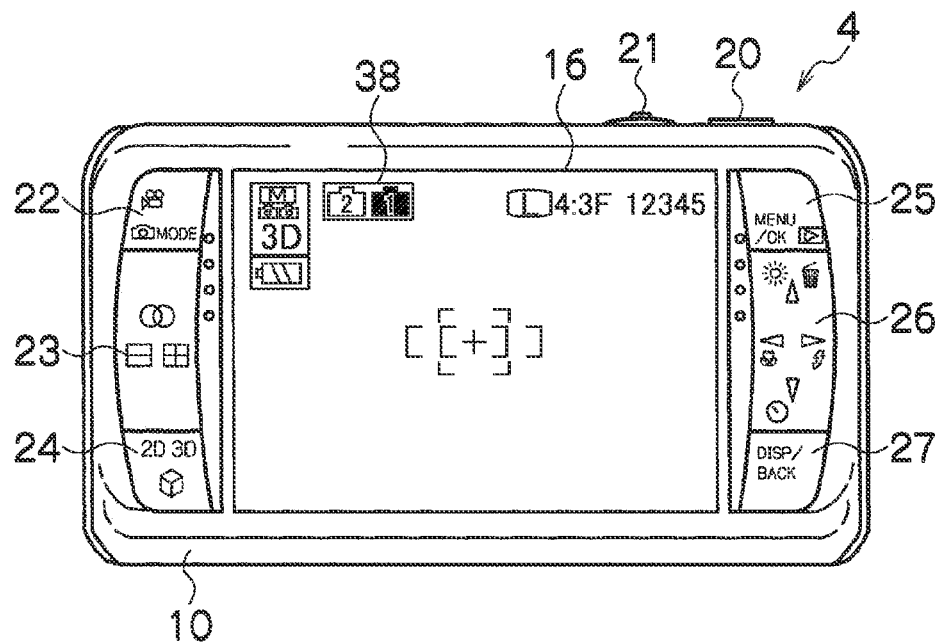

The CPU 110 takes the shooting confirmation image by the imaging element 122 and displays the shooting confirmation image on the monitor 16, and also displays guidance on the monitor 16 based on the information on the shooting order obtained in step S24 (step S25). If the first image is set to be shot by the left imaging system 13, and the second image is set to be shot by the right imaging system 12, the guidance 32 is displayed in which "1" is displayed on the left and "2" is displayed on the right, as shown in FIG. 20A. If the first image is set to be shot by the right imaging system 12, and the second image is set to be shot by the left imaging system 13, guidance 38 is displayed in which "1" is displayed on the right and "2" is displayed on the left, as shown in FIG. 20B. Since this phase is a shooting preparation phase for a first image, "1" of the guidance 32 and 38 is emphasized and displayed.

The CPU 110 determines whether or not the release switch 20 has been half pressed, that is, whether or not the S1ON signal has been inputted to the CPU 110 (step S11). If the release switch 20 has not been half pressed ("not pressed" in step S11), step S11 is performed again. If the release switch 20 has been half pressed ("pressed" in step S11), the CPU 110 senses the half pressing, and performs the AE light metering and the AF control for the left imaging system 13.

The CPU 110 determines whether or not the release switch 20 has been fully pressed, that is, whether or not the S2ON signal has been inputted to the CPU 110 (step S12). If the release switch 20 has not been fully pressed ("not pressed" in step S12), step S12 is performed again. If the release switch 20 has been fully pressed ("pressed" in step S12), the CPU 110 displays the guidance 35 indicating that the self-timer has been set to two seconds, on the monitor 16, and also starts the countdown of the self-timer (step S18). Along with the countdown of the self-timer, the CPU 100 displays the guidance 35 while decreasing the display of the guidance 35 like "2" to "1".

The CPU 110 determines whether or not the count of the self-timer has become "0", that is, whether or not the period of the self-timer has expired (step S19). If the period of the self-timer has not expired ("not expire" in step S19), step S19 is performed again. If the period of the self-timer has expired ("expired" in step S19), the CPU 110 uses the left imaging system 13 to execute the shooting process (step S13).

The CPU 110 performs the semi-transparent display of the image shot by the imaging element 123 in step S13, on the monitor 16, and also takes the shooting confirmation image by the imaging element 122, and performs the semi-transparent display of the shooting confirmation image on the monitor 16. Moreover, the CPU 110 displays the guidance on the monitor 16 based on the information on the shooting order obtained in step S24 (step S26). If the first image is set to be shot by the left imaging system 13, and the second image is set to be shot by the right imaging system 12, the guidance 32 is displayed in which "1" is displayed on the left and "2" is displayed on the right. If the first image is set to be shot by the right imaging system 12, and the second image is set to be shot by the left imaging system 13, the guidance 38 is displayed in which "1" is displayed on the right and "2" is displayed on the left. Since this phase is a shooting preparation phase for a second image, "2" of the guidance 32 and 38 is emphasized and displayed.

The CPU 110 determines whether or not the release switch 20 has been half pressed, that is, whether or not the S1ON signal has been inputted to the CPU 110 (step S15). If the release switch 20 has not been half pressed ("not pressed" in step S15), step S15 is performed again. If the release switch 20 has been half pressed ("pressed" in step S15), the CPU 110 senses the half pressing, and performs the AE light metering and the AF control for the right imaging system 12.

The CPU 110 determines whether or not the release switch 20 has been fully pressed, that is, whether or not the S2ON signal has been inputted to the CPU 110 (step S16). If the release switch 20 has not been fully pressed ("not pressed" in step S16), step S16 is performed again. If the release switch 20 has been fully pressed ("pressed" in step S16), the CPU 110 displays the guidance 35 indicating that the self-timer has been set to two seconds, on the monitor 16, and also starts the countdown of the self-timer (step S20). Along with the countdown of the self-timer, the CPU 100 displays the guidance 35 while decreasing the display of the guidance 35 like "2" to "1".

The CPU 110 determines whether or not the count of the self-timer has become "0", that is, whether or not the period of the self-timer has expired (step S21). If the period of the self-timer has not expired ("not expire" in step S21), step S21 is performed again. If the period of the self-timer has expired ("expired" in step S21), the CPU 110 uses the right imaging system 12 to execute the shooting process (step S17).

Thereby, the two subject images constituting the stereoscopic image are formed on the imaging elements 122 and 123, and the two pieces of image data are generated by the CDS/AMPs 124 and 125, respectively. The CPU 110 uses these two pieces of image data to generate the stereoscopic image. The CPU 110 sets the monitor 16 in the 3D mode, and as shown in FIG. 9, displays the generated stereoscopic image as the so-called post view on the monitor 16. Thereby, the shot stereoscopic image can be confirmed after shooting and before recording.

According to the present embodiment, since the shooting order is displayed as the guidance on the monitor 16, the photographer can recognize at a glance which imaging system is used and in which order the shooting is performed.

<Fifth Embodiment>

A fifth embodiment of the presently disclosed subject matter is a mode in which two images are shot with a time interval difference by one shutter release operation. A compound-eye digital camera 5 of the fifth embodiment will be described below. Since the compound-eye digital camera 5 is the same as the compound-eye digital camera 1 except the shooting process in the 3D double shooting mode, only the shooting process in the 3D double shooting mode will be described. Moreover, the same portions as those of the first embodiment to the fourth embodiment are assigned with the same reference numerals, and descriptions thereof are omitted.

Figure 21:
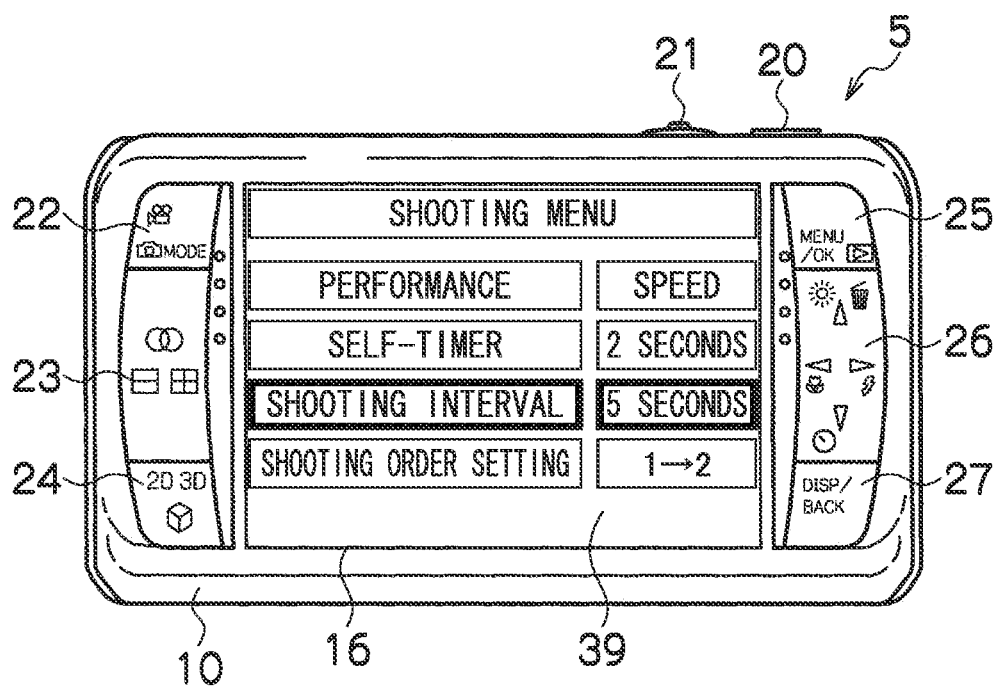
FIG. 21 is an example of the menu screen of a compound-eye digital camera 5 according to a fifth embodiment of the presently disclosed subject matter.

The present embodiment, in which the two images are taken with the time interval difference by one shutter release operation, is performed if the photographer has enabled a function of shooting the two images with the time interval difference by one shutter release operation (a time interval difference shooting mode). Setting of the time interval difference shooting mode is performed as follows. The MENU/OK button 25 is depressed while the compound-eye digital camera 5 is driven in the shooting mode, and thereby, a menu screen 39 (see FIG. 21) is displayed on the monitor 16. On the menu screen 39, "shooting interval" is selected via the cross button 26 or the like (in FIG. 21, "shooting interval" is highlighted and displayed, and the MENU/OK button 25 is depressed), and time of the shooting interval is selected. Time of a shooting interval timer can be designated, for example, between 0 to 10 seconds, and in the present embodiment, the shooting interval timer of 5 seconds is set. The setting of the shooting interval timer of 5 seconds is performed by highlighting and displaying "5 seconds" and depressing the MENU/OK button 25 in FIG. 21. Set information is recorded in the SDRAM 114.

Figure 22:
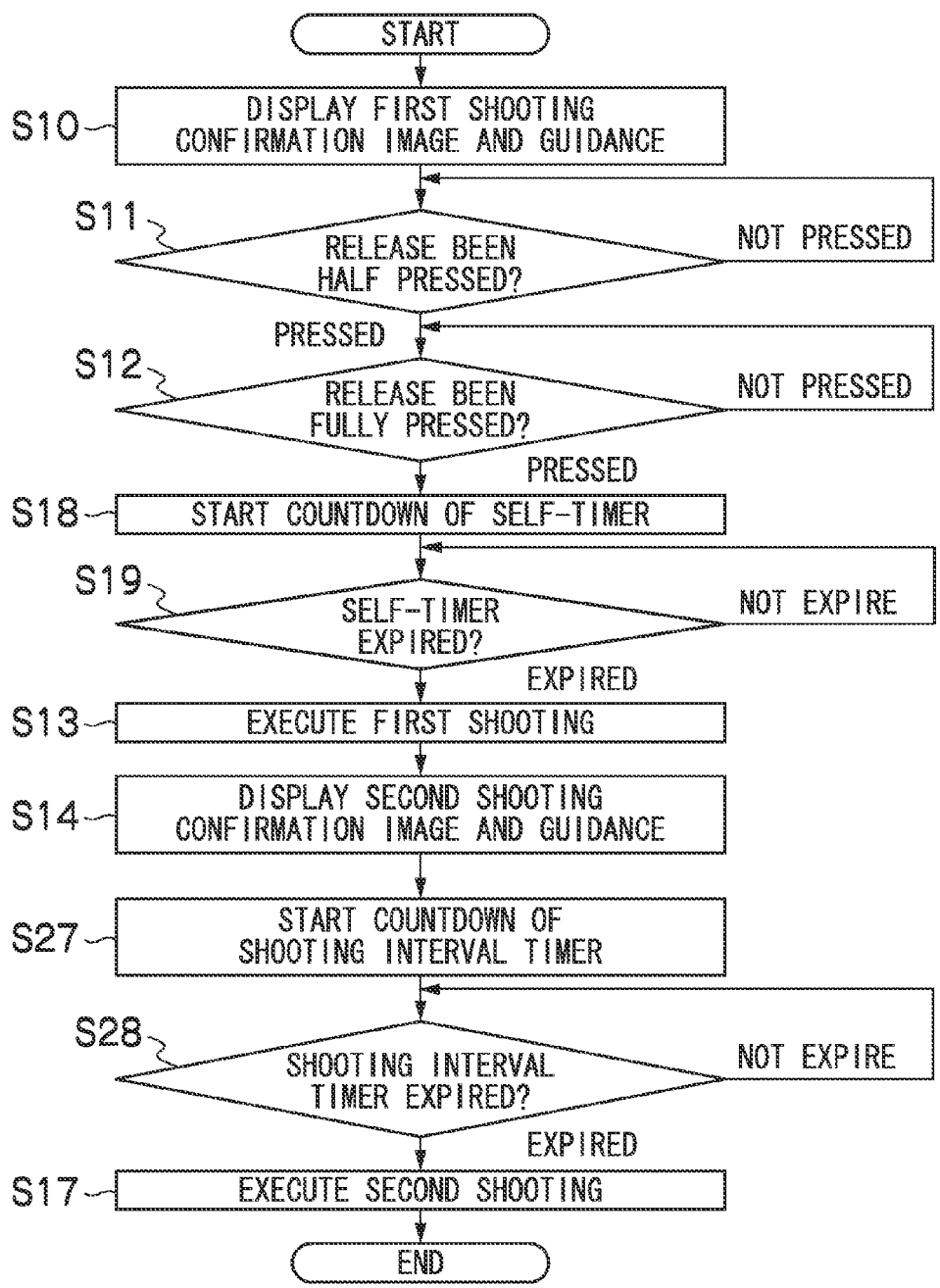
FIG. 22 is a flowchart showing a flow of the shooting process in the 3D double shooting mode in the compound-eye digital camera 5.

FIG. 22 is a flowchart showing the flow of the shooting process in the 3D double shooting mode in the compound-eye digital camera 5. The CPU 110 takes the shooting confirmation image by the imaging element 123, displays the shooting confirmation image on the monitor 16, and also displays the guidance 32 which indicates that the first image is shot by the left imaging system 13 and the second image is shot by the right imaging system 12, and in which "1" is emphasized and displayed, on the monitor 16 (step S10).

The CPU 110 determines whether or not the release switch 20 has been half pressed, that is, whether or not the S1ON signal has been inputted to the CPU 110 (step S11). If the release switch 20 has not been half pressed ("not pressed" in step S11), step S11 is performed again. If the release switch 20 has been half pressed ("pressed" in step S11), the CPU 110 senses the half pressing, and performs the AE light metering and the AF control for the left imaging system 13.

Figure 23A:
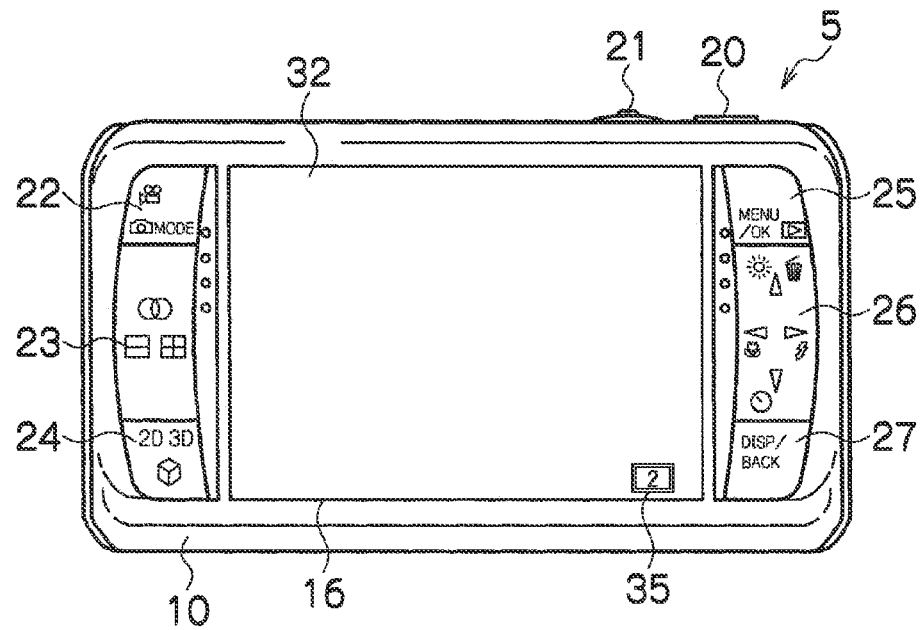
FIGS. 23A and 23B are examples of the shooting confirmation screen of the compound-eye digital camera 5.

The CPU 110 determines whether or not the release switch 20 has been fully pressed, that is, whether or not the S2ON signal has been inputted to the CPU 110 (step S12). If the release switch 20 has not been fully pressed ("not pressed" in step S12), step S12 is performed again. If the release switch 20 has been fully pressed ("pressed" in step S12), the CPU 110 displays the guidance 35 indicating that the self-timer has been set to two seconds, on the monitor 16 as shown in FIG. 23A, and also starts the countdown of the self-timer (step S18). Along with the countdown of the self-timer, the CPU 100 displays the guidance 35 while decreasing the display of the guidance 35 like "2" to "1".

The CPU 110 determines whether or not the count of the self-timer has become "0", that is, whether or not the period of the self-timer has expired (step S19). If the period of the self-timer has not expired ("not expire" in step S19), step S19 is performed again. If the period of the self-timer has expired ("expired" in step S19), the CPU 110 uses the left imaging system 13 to execute the shooting process (step S13).

Figure 23B:
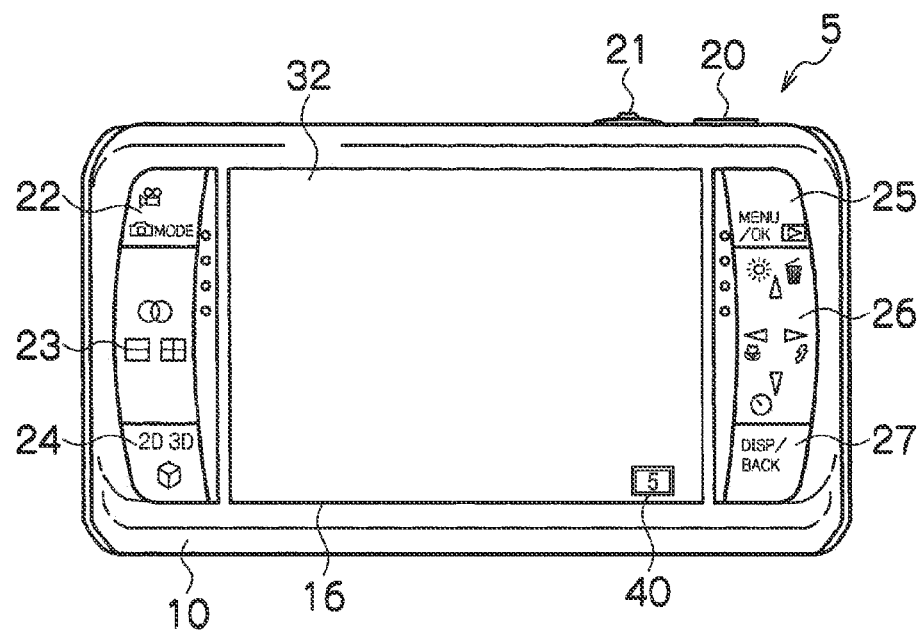

The CPU 110 performs the semi-transparent display of the image shot by the imaging element 123 in step S13, on the monitor 16, and also takes a second shooting confirmation image by the imaging element 122, and performs the semi-transparent display of the shooting confirmation image on the monitor 16. Moreover, the CPU 110 displays the guidance 32 which indicates that the first image is shot by the left imaging system 13 and the second image is shot by the right imaging system 12, and in which "2" is emphasized and displayed, and guidance 40 indicating that the shooting interval timer has been set to 5 seconds, on the monitor 16 as shown in FIG. 23B, and also starts countdown of the shooting interval timer (step S27).

The CPU 110 determines whether or not a count of the shooting interval timer has become "0", that is, whether or not a period of the shooting interval timer has expired (step S28). If the period of the shooting interval timer has not expired ("not expire" in step S28), step S28 is performed again. If the period of the shooting interval timer has expired ("expired" in step S28), the CPU 110 uses the right imaging system 12 to execute the shooting process (step S17).

Thereby, the two subject images constituting the stereoscopic image are formed on the imaging elements 122 and 123, and the two pieces of image data are generated by the CDS/AMPs 124 and 125, respectively. The CPU 110 uses these two pieces of image data to generate the stereoscopic image. The CPU 110 sets the monitor 16 in the 3D mode, and as shown in FIG. 9, displays the generated stereoscopic image as the so-called post view on the monitor 16. Thereby, the shot stereoscopic image can be confirmed after shooting and before recording.

According to the present embodiment, the first image and the second image can be shot with a predetermined time interval difference by one release operation. Thus, if the shooting is performed on a moving object such as a train or a car, the stereoscopic image with an arbitrary stereoscopic effect can be taken by one release operation.

It should be noted that application of the presently disclosed subject matter is not limited to the compound-eye digital camera having two imaging systems, and the presently disclosed subject matter may be applied to a compound-eye digital camera having three or more imaging systems. In the case of the compound-eye digital camera having three or more imaging systems, it is not necessary to use all the imaging systems to perform the shooting, and at least two imaging systems may be used. Moreover, the imaging systems are not limited to the case of being arranged side by side, and may be arranged aslant or the like. Moreover, the presently disclosed subject matter can be applied not only to the digital camera, but also to various imaging devices such as a video camera, a cellular phone and the like. Moreover, the presently disclosed subject matter can also be provided as a program applied to the compound-eye digital camera and the like.

What is claimed is:

1. A compound-eye imaging apparatus comprising:
    two image pickup devices which take subject images viewed from two viewpoints, as a stereoscopic image;
    a shooting mode setting device which sets one of a 3D (three dimensional) double shooting mode in which one of the two image pickup devices is used to perform shooting by a first shutter release operation, and the other one of the two image pickup devices is used to perform shooting by a second shutter release operation and a normal shooting mode in which the two image pickup device is used to perform shooting by one shutter release operation;
    a determination device which, if the 3D double shooting mode has been set, accepts a shutter release operation, and determines whether the accepted shutter release operation is the first shutter release operation or the second shutter release operation;
    a shooting control device which controls the two image pickup devices in a manner that a predetermined image pickup device in the two image pickup devices is used to perform shooting if it is determined by the determination device that the first shutter release operation is accepted, and that the other image pickup device in the two image pickup devices is used to perform shooting if it is determined by the determination device that the second shutter release operation is accepted; and
    a cancellation input device which inputs cancellation of the 3D double shooting mode,
    wherein the determination device further determines whether the first shutter release operation is a half pressing in which a shooting preparation process is performed or a full pressing in which shooting and recording processes of the image are performed, and
    wherein if the cancellation of the 3D double shooting mode is inputted after the half pressing of the first shutter release operation in which the shooting preparation process is performed and before the full pressing of the first shutter release operation in which the shooting and recording processes of the image are performed, or after the half pressing of the second shutter release operation in which the shooting preparation process is performed and before the full pressing of the second shutter release operation in which the shooting and recording processes of the image are performed, then the determination device determines the shutter release operation which is accepted next, as the half pressing of the first shutter release operation in which the shooting preparation process is performed or the full pressing of the first shutter release operation in which the shooting and recording processes of the image are performed.

2. The compound-eye imaging apparatus according to claim 1, further comprising:
    a storage device which stores an image outputted from the predetermined one image pickup device by the first shutter release operation, and a picked-up image outputted from the other image pickup device by the second shutter release operation, in one file.

3. The compound-eye imaging apparatus according to claim 1, further comprising:
    a display device which can display a stereoscopic image or a plane image; and
    a display control device which, if it is determined by the determination device that the first shutter release operation is accepted and that the second shutter release operation has not been accepted yet, displays the image outputted from the predetermined image pickup device by the first shutter release operation in a semi-transparent manner on the display device, and displays a picked-up image outputted from the other image pickup device, as a shooting confirmation image, on the display device.

4. The compound-eye imaging apparatus according to claim 1, further comprising:
    a self-timer setting device which sets a self-timer mode,
    wherein if the self-timer mode is set, the shooting control device uses any one of the two image pickup devices to perform shooting, after a first time elapses since it is determined that the shutter release operation is accepted.

5. The compound-eye imaging apparatus according to claim 1, further comprising:
    the cancellation input device which inputs cancellation of the 3D double shooting mode,
    wherein if the cancellation of the 3D double shooting mode is inputted after the first shutter release operation is accepted by the determination device, the determination device determines the shutter release operation which is accepted next, as the first shutter release operation.

6. The compound-eye imaging apparatus according to claim 1, further comprising:
    a time interval difference shooting mode setting device which sets a time interval difference shooting mode in which two images are taken with a time interval difference by one shutter release operation, wherein if the time interval difference shooting mode has been set, the shooting control device uses the other image pickup device to perform shooting, after a second time elapses since it is determined that the first shutter release operation is accepted.

7. The compound-eye imaging apparatus according to claim 3, wherein
the display control device displays a picked-up image outputted from any one of the two image pickup devices, as a shooting confirmation image, on the display device, and displays guidance indicating which of the two image pickup devices is the predetermined image pickup device, on the display device.

8. The compound-eye imaging apparatus according to claim 1, further comprising:
a shooting order setting device which sets which of the two image pickup devices is the predetermined image pickup device.

9. The compound-eye imaging apparatus according to claim 1, further comprising:
a parallax adjustment device which adjusts a parallax between an image outputted from the predetermine image pickup device by the first shutter release operation and an image outputted from the other image pickup device by the second shutter release operation.

* * * * *